US012439228B2

(12) United States Patent
Shrestha et al.

(10) Patent No.: US 12,439,228 B2
(45) Date of Patent: Oct. 7, 2025

(54) MANAGING GROUP CONFIGURATIONS IN WIRELESS COMMUNICATIONS SYSTEMS

(71) Applicant: QUALCOMM Incorporated, San Diego, CA (US)

(72) Inventors: Bharat Shrestha, San Diego, CA (US); Alberto Rico Alvarino, San Diego, CA (US); Umesh Phuyal, San Diego, CA (US); Xiao Feng Wang, San Diego, CA (US); Le Liu, San Jose, CA (US); Liangping Ma, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 17/838,054

(22) Filed: Jun. 10, 2022

(65) Prior Publication Data
US 2023/0403538 A1    Dec. 14, 2023

(51) Int. Cl.
 *H04W 4/08*     (2009.01)
 *H04L 1/00*     (2006.01)
 *H04W 72/23*    (2023.01)
 *H04W 76/10*    (2018.01)

(52) U.S. Cl.
CPC ............. *H04W 4/08* (2013.01); *H04L 1/0061* (2013.01); *H04W 72/23* (2023.01); *H04W 76/10* (2018.02)

(58) Field of Classification Search
CPC ....... H04W 4/08; H04W 72/23; H04W 76/10; H04W 84/06; H04W 12/35; H04W 12/66; H04W 12/106; H04W 36/0055; H04W 48/12; H04L 1/0061; H04B 7/18513; H04B 7/18541
See application file for complete search history.

(56) References Cited

U.S. PATENT DOCUMENTS

| 2010/0191965 | A1 | 7/2010 | Fischer et al. |
| 2011/0013597 | A1* | 1/2011 | Hwang ........... H04W 36/00226 455/426.1 |
| 2015/0078188 | A1* | 3/2015 | Xu ........................ H04W 74/00 370/252 |
| 2016/0007252 | A1* | 1/2016 | Larmo .................. H04W 76/28 370/332 |

(Continued)

FOREIGN PATENT DOCUMENTS

| CA | 3042955 A1 * | 6/2018 | ............ H03M 13/09 |
| CA | 3097426 A1 * | 10/2019 | ............ H04W 72/23 |

(Continued)

OTHER PUBLICATIONS

International Search Report and Written Opinion—PCT/US2023/068063—ISA/EPO—Sep. 28, 2023.

*Primary Examiner* — Sujoy K Kundu
*Assistant Examiner* — Vladislav Y Agureyev
(74) *Attorney, Agent, or Firm* — Holland & Hart LLP

(57) ABSTRACT

Methods, systems, and devices for wireless communication are described. A user equipment (UE) may receive first control signaling indicating a configuration associated with a target network node in a non-terrestrial network. The configuration may include a first UE-group configuration and a UE-specific configuration including integrity information for the first UE-group configuration. The UE may perform a connection operation based on a trust status of the first UE-group configuration.

30 Claims, 14 Drawing Sheets

(56) References Cited

U.S. PATENT DOCUMENTS

| | | | | |
|---|---|---|---|---|
| 2016/0262066 A1* | 9/2016 | Ozturk | .............. | H04W 74/0833 |
| 2017/0311217 A1* | 10/2017 | Jung | .................... | H04W 48/08 |
| 2018/0091968 A1* | 3/2018 | Ly | ...................... | H04W 36/324 |
| 2018/0317213 A1* | 11/2018 | Islam | .................... | H04L 1/1614 |
| 2019/0037449 A1* | 1/2019 | Fujishiro | ................ | H04W 4/40 |
| 2019/0246323 A1* | 8/2019 | Kim | ................. | H04W 36/0058 |
| 2019/0253945 A1* | 8/2019 | Paladugu | .......... | H04W 12/0433 |
| 2019/0297547 A1* | 9/2019 | Tsai | .................... | H04W 24/08 |
| 2020/0076535 A1* | 3/2020 | Xu | .................... | H03M 13/2906 |
| 2020/0137643 A1* | 4/2020 | Li | ............................. | H04L 9/08 |
| 2020/0145940 A1* | 5/2020 | Gage | .................. | H04W 36/04 |
| 2020/0396647 A1* | 12/2020 | Lee | ...................... | H04W 36/32 |
| 2021/0014924 A1* | 1/2021 | Zheng | .................... | H04L 47/34 |
| 2021/0067265 A1* | 3/2021 | Agarwal | ............... | H04K 3/224 |
| 2021/0076327 A1* | 3/2021 | Li | ..................... | H04W 52/0235 |
| 2021/0112600 A1* | 4/2021 | Lei | ........................ | H04L 5/0091 |
| 2021/0136641 A1* | 5/2021 | Roy | .................... | H04W 36/249 |
| 2021/0227442 A1* | 7/2021 | Yiu | .................... | H04W 36/00837 |
| 2021/0243839 A1* | 8/2021 | Krishnaswamy | ..... | H04W 24/04 |
| 2021/0377825 A1* | 12/2021 | Deenoo | ................ | H04B 7/1851 |
| 2021/0399797 A1* | 12/2021 | Khan | .................... | H04W 36/085 |
| 2022/0264680 A1* | 8/2022 | Kim | .................... | H04W 76/15 |
| 2022/0271909 A1* | 8/2022 | Abotabl | ..................... | H04L 5/14 |
| 2022/0312283 A1 | 9/2022 | Chen et al. | | |
| 2022/0345970 A1* | 10/2022 | Kim | .................... | H04W 36/305 |
| 2023/0247506 A1* | 8/2023 | Xu | ........................ | H04B 7/0621 |
| | | | | 370/331 |
| 2023/0262550 A1* | 8/2023 | Dong | ................ | H04W 36/0009 |
| | | | | 370/331 |
| 2023/0309172 A1* | 9/2023 | Zhu | ........................ | H04W 40/34 |
| 2024/0015684 A1* | 1/2024 | Wiacek | .................. | H04W 60/04 |
| 2024/0187272 A1* | 6/2024 | Yoshioka | ............ | H04L 12/1868 |

FOREIGN PATENT DOCUMENTS

| | | | | | |
|---|---|---|---|---|---|
| CA | 3035000 | C | * | 6/2022 | ........... H04B 7/0404 |
| CN | 109600803 | A | | 4/2019 | |
| CN | 107819714 | B | * | 4/2020 | ........ H04W 72/0453 |
| CN | 114391270 | A | * | 4/2022 | ........ H04W 36/0009 |
| CN | 115002914 | A | * | 9/2022 | .......... H04W 52/242 |
| CN | 116349304 | A | * | 6/2023 | ............. H04L 45/28 |
| EP | 4221082 | A2 | | 8/2023 | |
| EP | 4462881 | A2 | | 11/2024 | |
| TW | 201622475 | A | * | 6/2016 | ........... H04W 16/32 |
| WO | WO-2017119919 | A1 | * | 7/2017 | ........ H04W 36/0027 |
| WO | WO-2020082247 | A1 | * | 4/2020 | ............ H04W 12/03 |
| WO | WO-2021008522 | A1 | | 1/2021 | |
| WO | WO-2021072413 | A1 | * | 4/2021 | ............. H04L 5/0007 |
| WO | WO-2021092585 | A1 | * | 5/2021 | ........ H04W 74/0833 |
| WO | WO-2022087118 | A1 | | 4/2022 | |

* cited by examiner

MANAGING GROUP CONFIGURATIONS IN WIRELESS COMMUNICATIONS SYSTEMS

FIELD OF TECHNOLOGY

The following relates to wireless communication, including managing group configurations in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support managing group configurations in wireless communications systems. Various aspects of the present disclosure relate to securing group configurations (e.g., a group radio resource control (RRC) configuration) in a wireless communications system. A satellite or a network entity may transmit a group RRC configuration to a group of UEs in the wireless communications system. The group RRC configuration may include parameters associated with a target network entity (also referred to as a target cell). Additionally, the group RRC configuration may include a UE specific configuration for the group of UEs. In some examples, the satellite or the network entity may secure the group RRC configuration using a hash value or a cyclic redundancy check (CRC) value. In some other examples, the satellite or the network entity may secure the group RRC configuration based on a radio network temporary identifier (RNTI) value configured for the group of UEs. One or both of the UE and the network entity may determine a trust status of the group RRC configuration and perform a connection procedure (e.g., a handover procedure). A trust status may be an indication of whether the group RRC configuration has been compromised.

A method for wireless communication at a UE is described. The method may include receiving first control signaling indicating a configuration associated with a target network node in a non-terrestrial network, the configuration including a first UE-group configuration and a UE-specific configuration including integrity information for the first UE-group configuration, determining a trust status of the first UE-group configuration, and performing a connection operation based on the trust status of the first UE-group configuration.

An apparatus for wireless communication at a UE is described. The apparatus may include a processor, memory coupled with the processor, and instructions stored in the memory. The instructions may be executable by the processor to cause the apparatus to receive first control signaling indicating a configuration associated with a target network node in a non-terrestrial network, the configuration including a first UE-group configuration and a UE-specific configuration including integrity information for the first UE-group configuration, determine a trust status of the first UE-group configuration, and perform a connection operation based on the trust status of the first UE-group configuration.

Another apparatus for wireless communication at a UE is described. The apparatus may include means for receiving first control signaling indicating a configuration associated with a target network node in a non-terrestrial network, the configuration including a first UE-group configuration and a UE-specific configuration including integrity information for the first UE-group configuration, means for determining a trust status of the first UE-group configuration, and means for performing a connection operation based on the trust status of the first UE-group configuration.

A non-transitory computer-readable medium storing code for wireless communication at a UE is described. The code may include instructions executable by a processor to receive first control signaling indicating a configuration associated with a target network node in a non-terrestrial network, the configuration including a first UE-group configuration and a UE-specific configuration including integrity information for the first UE-group configuration, determine a trust status of the first UE-group configuration, and perform a connection operation based on the trust status of the first UE-group configuration.

Some examples of the method, apparatuses, and non-transitory computer-readable medium described herein may further include operations, features, means, or instructions for performing an integrity check of the first UE-group configuration to obtain the trust status of the first UE-group configuration and where performing the connection operation may be based on the integrity check of the first UE-group configuration, and where the connection operation includes a handover from a source network node to the target network node in the non-terrestrial network.

In some examples of the method, apparatuses, and non-transitory computer-readable medium described herein, performing the integrity check of the first UE-group configuration may include operations, features, means, or instructions for determining a change in a hash value or a cyclic redundancy check (CRC) associated with the first UE-group configuration based on the UE-specific configuration, where the integrity information including the hash value or the CRC.

Some examples of the method, apparatuses, and non-transitory computer-readable medium described herein may further include operations, features, means, or instructions for performing a post integrity check operation based on the trust status of the first UE-group configuration.

In some examples of the method, apparatuses, and non-transitory computer-readable medium described herein, performing the connection operation may include operations, features, means, or instructions for triggering a reestablishment connection operation to the target network node based on the trust status of the first UE-group configuration.

Some examples of the method, apparatuses, and non-transitory computer-readable medium described herein may further include operations, features, means, or instructions for transmitting second control signaling indicating the trust status of the first UE-group configuration, receiving third control signaling indicating a second UE-group configuration based on the trust status of the first UE-group configuration according to the integrity information, and where performing the connection operation may be based on the second UE-group configuration.

Some examples of the method, apparatuses, and non-transitory computer-readable medium described herein may further include operations, features, means, or instructions for generating a hash value or a CRC associated with the first UE-group configuration and transmitting second control signaling indicating the hash value or the CRC associated with the first UE-group configuration, the second control signaling including a handover complete message.

Some examples of the method, apparatuses, and non-transitory computer-readable medium described herein may further include operations, features, means, or instructions for selecting one or more parameters associated with the first UE-group configuration and transmitting second control signaling indicating the one or more parameters associated with the first UE-group configuration.

In some examples of the method, apparatuses, and non-transitory computer-readable medium described herein, the configuration excludes a master security key update.

Some examples of the method, apparatuses, and non-transitory computer-readable medium described herein may further include operations, features, means, or instructions for transmitting second control signaling indicating whether the first UE-group configuration includes a common configuration or a default configuration and where performing the connection operation may be based on the second control signaling.

Some examples of the method, apparatuses, and non-transitory computer-readable medium described herein may further include operations, features, means, or instructions for receiving a system information block (SIB) associated with the target network node and a non-terrestrial network-specific SIB associated with a network entity in the non-terrestrial network and transmitting second control signaling indicating a handover complete, where performing the connection operation may be based on the second control signaling.

Some examples of the method, apparatuses, and non-transitory computer-readable medium described herein may further include operations, features, means, or instructions for receiving a downlink control information (DCI) over a physical downlink control channel (PDCCH), the DCI scheduling a physical downlink shared channel (PDSCH), the DCI including a group radio network temporary identifier (G-RNTI) or a system information radio network temporary identifier (SI-RNTI) for the integrity information and where receiving the first control signaling indicating the configuration associated with the target network node in the non-terrestrial network may be based on the DCI.

Some examples of the method, apparatuses, and non-transitory computer-readable medium described herein may further include operations, features, means, or instructions for determining a time interval for receiving the PDCCH based on scheduling information, where receiving the DCI over the PDCCH includes and receiving the DCI over the PDCCH during the time interval.

Some examples of the method, apparatuses, and non-transitory computer-readable medium described herein may further include operations, features, means, or instructions for determining a PDCCH search space for receiving the PDCCH based on a search space configuration associated with a group of UEs, where receiving the DCI over the PDCCH includes and receiving the DCI over the PDCCH based on the PDCCH search space.

Some examples of the method, apparatuses, and non-transitory computer-readable medium described herein may further include operations, features, means, or instructions for monitoring the G-RNTI or a cell radio network temporary identifier (C-RNTI) based on a periodicity and where receiving the DCI over the PDCCH may be based on the G-RNTI or the C-RNTI.

In some examples of the method, apparatuses, and non-transitory computer-readable medium described herein, the first UE-group configuration includes one or more cell-specific parameters associated with the target network node.

In some examples of the method, apparatuses, and non-transitory computer-readable medium described herein, the one or more cell-specific parameters include one or more broadcast cell-specific parameters of a system information associated with the target network node.

In some examples of the method, apparatuses, and non-transitory computer-readable medium described herein, the UE-specific configuration includes one or more UE-specific parameters associated with a group of UEs in the non-terrestrial network.

Some examples of the method, apparatuses, and non-transitory computer-readable medium described herein may further include operations, features, means, or instructions for receiving the first UE-group configuration in a logical channel associated with an RLC transparent mode or a signaling radio bearer configuration, or both.

In some examples of the method, apparatuses, and non-transitory computer-readable medium described herein, the first UE-group configuration includes a common configuration or a default configuration.

A method for wireless communication at a network entity is described. The method may include transmitting first control signaling indicating a configuration associated with a target network node in a non-terrestrial network, the configuration including a first UE-group configuration and a UE-specific configuration including integrity information for the first UE-group configuration, determining a trust status of the first UE-group configuration, and performing a connection operation based on the trust status of the first UE-group configuration.

An apparatus for wireless communication at a network entity is described. The apparatus may include a processor, memory coupled with the processor, and instructions stored in the memory. The instructions may be executable by the processor to cause the apparatus to transmit first control signaling indicating a configuration associated with a target network node in a non-terrestrial network, the configuration including a first UE-group configuration and a UE-specific configuration including integrity information for the first UE-group configuration, determine a trust status of the first UE-group configuration, and perform a connection operation based on the trust status of the first UE-group configuration.

Another apparatus for wireless communication at a network entity is described. The apparatus may include means for transmitting first control signaling indicating a configuration associated with a target network node in a non-terrestrial network, the configuration including a first UE-group configuration and a UE-specific configuration including integrity information for the first UE-group configuration, means for determining a trust status of the first UE-group configuration, and means for performing a connection operation based on the trust status of the first UE-group configuration.

A non-transitory computer-readable medium storing code for wireless communication at a network entity is described. The code may include instructions executable by a processor to transmit first control signaling indicating a configuration associated with a target network node in a non-terrestrial network, the configuration including a first UE-group configuration and a UE-specific configuration including integrity information for the first UE-group configuration, determine a trust status of the first UE-group configuration, and perform a connection operation based on the trust status of the first UE-group configuration.

Some examples of the method, apparatuses, and non-transitory computer-readable medium described herein may further include operations, features, means, or instructions for performing an integrity check of the first UE-group configuration to obtain the trust status of the first UE-group configuration and where performing the connection operation may be based on the integrity check of the first UE-group configuration.

Some examples of the method, apparatuses, and non-transitory computer-readable medium described herein may further include operations, features, means, or instructions for receiving second control signaling indicating a change to a hash value or a CRC associated with the first UE-group configuration and transmitting third control signaling indicating a second UE-group configuration based on the trust status of the first UE-group configuration according to the integrity information.

Some examples of the method, apparatuses, and non-transitory computer-readable medium described herein may further include operations, features, means, or instructions for receiving second control signaling indicating one or more parameters associated with the first UE-group configuration.

Some examples of the method, apparatuses, and non-transitory computer-readable medium described herein may further include operations, features, means, or instructions for receiving a request to verify the one or more parameters associated with the first UE-group configuration and determining the trust status of the first UE-group configuration based on verifying the one or more parameters associated with the first UE-group configuration.

Some examples of the method, apparatuses, and non-transitory computer-readable medium described herein may further include operations, features, means, or instructions for transmitting the first UE-group configuration in a logical channel associated with an RLC transparent mode or a signaling radio bearer configuration, or both.

Some examples of the method, apparatuses, and non-transitory computer-readable medium described herein may further include operations, features, means, or instructions for transmitting DCI over a PDCCH, the DCI scheduling a PDSCH, the DCI including a G-RNTI or a SI-RNTI for the integrity information.

Some examples of the method, apparatuses, and non-transitory computer-readable medium described herein may further include operations, features, means, or instructions for transmitting the second control signaling indicating the second UE-group configuration may be based on a G-RNTI.

DETAILED DESCRIPTION

Figure 1:
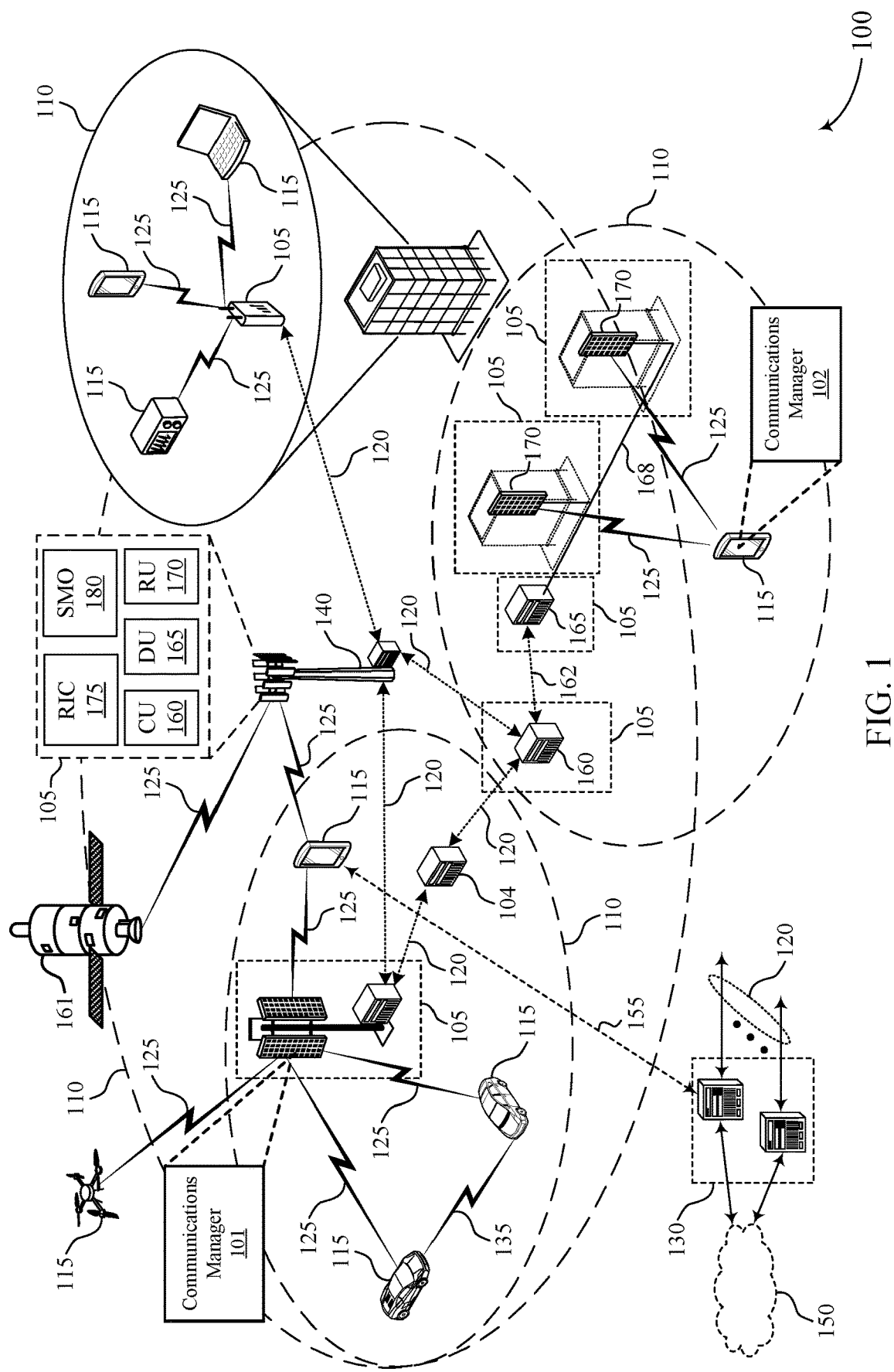
FIG. 1 illustrates an example of a wireless communications system that supports managing group configurations in wireless communications systems in accordance with one or more aspects of the present disclosure.

A wireless communications system may include communication devices, such as a UE or a network entity (e.g., an eNodeB (eNB), a next-generation NodeB or a giga-NodeB, either of which may be referred to as a gNB, or some other base station), that supports wireless communications using one or multiple radio access technologies. Examples of radio access technologies include 4G systems, such as LTE systems, 5G systems, which may be referred to as NR systems, or other systems and radio technologies, including future systems and radio technologies not explicitly mentioned herein (e.g., sixth generation (6G) systems). The wireless communications system may be a terrestrial communications system or a non-terrestrial communications system, or a combination thereof. A non-terrestrial communications system may be an example of a wireless communications system that includes non-terrestrial communication devices such as satellites. In the example of a non-terrestrial communications system, a satellite may support wireless communication with communication devices in the terrestrial communications system (e.g., at or relatively near ground level).

A satellite may support wireless communication with a network entity (e.g., a base station) and a group of UEs using a communication link (also referred to as a feeder link) from a ground gateway, such as the network entity to the satellite. In some cases, because the satellite may be moving at high-speeds relative to the communication devices operating within the terrestrial communications system, the satellite may have to switch the feeder link (e.g., from the ground gateway, such as the network entity to the satellite) to continue to support wireless communications with the group of UEs in the terrestrial communications system. For example, a network entity (such as, a serving base station) for a group of UEs may become out of coverage for the satellite and, as a result, the satellite may have to connect to another network entity (such as, another base station) to handover the group of UEs to continue to support wireless communication with the group of UEs. Some techniques for handover of the group of UEs may be inefficient due to signaling dedicated for each UE separately, which may be inefficient for handovers in non-terrestrial network.

Various aspects of the present disclosure relate to securing group configurations (e.g., a group radio resource control (RRC) configuration) in a wireless communications system. A satellite or a network entity may transmit a group RRC configuration (also referred to as a common configuration) to a group of UEs in the wireless communications system. The group RRC configuration may include parameters associated with a target network entity (also referred to as a target cell). Additionally, the group RRC configuration may include a UE specific configuration for the group of UEs. In some examples, the satellite or the network entity may secure the group RRC configuration using a hash value or a cyclic redundancy check (CRC) value. In some other examples, the satellite or the network entity may secure the group RRC configuration based on a radio network temporary identifier (RNTI) value configured for the group of UEs as described herein.

One or both of the UE and the network entity may determine a trust status of the group RRC configuration and perform a connection procedure (e.g., a handover procedure). A trust status may be an indication of whether the group RRC configuration has been compromised. The target network entity (e.g., the target cell) may receive a handover complete message from the group of UEs and determine whether the group RRC configuration has been compromised, for example, based on the hash value, the CRC value, the parameters provided by the group of UEs, etc. If the target network entity determines that the group RRC configuration has been compromised, the target network entity may transmit a new RRC configuration to the group of UEs. Otherwise, the target network entity may complete the handover for the group of UEs. Additionally, or alternatively, one or more UEs of the group of UEs may determine whether group RRC configuration has been compromised and perform operations as described herein.

Aspects of the disclosure are initially described in the context of wireless communications systems. Aspects of the disclosure are further illustrated by and described with reference to apparatus diagrams, system diagrams, and flowcharts that relate to managing group configurations in wireless communications systems.

FIG. 1 illustrates an example of a wireless communications system 100 that supports managing group configurations in wireless communications systems in accordance with one or more aspects of the present disclosure. The wireless communications system 100 may include one or more network entities 105, one or more UEs 115, and a core network 130. In some examples, the wireless communications system 100 may be an LTE network, an LTE-Advanced (LTE-A) network, an LTE-A Pro network, an NR network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support managing group configurations in wireless communications systems as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions.

The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170)

may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may be a terrestrial communications system or a non-terrestrial communications system, or a combination thereof. For example, the wireless communications system 100 may include one or more of network entities 105, UEs 115, and satellites 161. A satellite 161 may communicate with the network entities 105 (also referred to as gateways in non-terrestrial networks) and the UEs 115. The satellite 161 may be any suitable type of communication satellite configured to communicate with one or more of the network entities 105 or the UEs 115 in the wireless communications system 100.

A satellite 161 may be configured to provide wireless communication service in a predefined geographical service area 110. The satellite 161 may be any distance away from the surface of the earth. In some examples, the satellite 161 may be in one or more of a geosynchronous equatorial orbit (GEO), a medium-earth orbit (MEO), or a low-earth orbit (LEO). A GEO may be a circular and equatorial orbit around earth at an altitude, for example, of 35,786 km. The orbital period of the GEO may be equal to the earth rotation period. A MEO may be a circular orbit around earth at an altitude, for example, between from 7,000 to 25,000 km. a LEO may be a circular orbit around earth and at an altitude, for example, between 300 to 1,500 km.

In the example of a non-terrestrial communications system, a satellite 161 may be moving at high-speeds relative to one or more of the network entities 105 or the UEs 115 operating within a terrestrial communications system (for example, at or relatively near ground level). In some cases, because the satellite 161 may be moving at high-speeds relative to one or more of the network entities 105 or the UEs 115 operating within the terrestrial communications system, the satellite 161 may have to switch a communication link 125 (e.g., from a ground gateway, such as a network entity 105 to the satellite) to continue to support wireless communications with the group of UEs 115 in the terrestrial communications system. For example, a network entity 105 for the group of UEs 115 may become out of coverage for the satellite 161 and, as a result, the satellite 161 may have to connect to another network entity 105 and handover the group of UEs 115 to the other network entity 105 and continue to support wireless communication with the group of UEs 115.

In some cases, as part of the handover, the network entity 105 or the satellite 161 may provide each UE 115 of the group of UEs 115 with a dedicated handover command. However, this method of handover for the group of UEs 115 may be inefficient. In some other cases, to reduce overhead signaling in the wireless communications system 100, the network entity 105 or the satellite 161 may broadcast a message including a default RRC configuration or a group RRC configuration for a target network entity 105 (e.g., a target cell). Alternatively, the network entity 105 or the satellite 161 may transmit a group RRC message including a default RRC configuration or a group RRC configuration for the target network entity 105. The network entity 105 or the satellite 161 may secure the group RRC message by encrypting the group RRC message with a security key. Each UE 115 of the group of UEs 115 may be associated with a separate (e.g., different) security key for decrypting the RRC message. However, this method of handover for the group of UEs 115 may also be inefficient.

In other cases, the network entity 105 or the satellite 161 may establish a configured signaling radio bearer (SRB) for exchange of RRC configurations to support handover for the group of UEs 115. The RRC configurations may be group specific RRC configurations. The network entity 105 or the satellite 161 may transmit, to the group of UEs 115, an RRC message including a list of RRC reconfigurations for the group of UEs 115. In some cases, there may be a change (e.g., a delta) in RRC configuration based on each UE 115 of the group of UEs 115 current RRC configuration. The network entity 105 or the satellite 161 may support using access stratum (AS) security to secure the RRC configurations. For example, the network entity 105 or the satellite 161 may support using group AS keys, which may be provided to each UE 115 of the group of UEs 115 and other UEs 115 joining the group of UEs 115. A UE 115 may continue using an RRC configuration if no other RRC reconfiguration is provided for the UE 115. One or more of the network entities 105, the UEs 115, or the satellites 161 may derive AS key based on a set of parameters (e.g., cell specific or group specific parameter). However, this method of using a configured SRB for the handover of the group of UEs 115 may also be inefficient.

Various aspects of the present disclosure relate to a handover of a group of UEs 115 in the wireless communications system 100, including the satellite 161 and the network entities 105 supporting secure communication for a group RRC configuration for the group of UEs 115 as described herein. A network entity 105 or a satellite 161, or both, may include a communications manager 101 that may support managing group configurations in the wireless communications system 100 in accordance with examples as disclosed herein. The communications manager 101 may be an example of aspects of a communications manager described with reference to FIGS. 5 through 8. A UE 115 may include a communications manager 102 that may support managing group configurations in the wireless communications system 100 in accordance with examples as disclosed herein. The communications manager 102 may be an example of aspects of a communications manager described with reference to FIGS. 9 through 12. The wireless communications system 100 may promote high reliability and low latency wireless communication for the network entities 105, the UEs 115, and the satellites 161.

Figure 2:
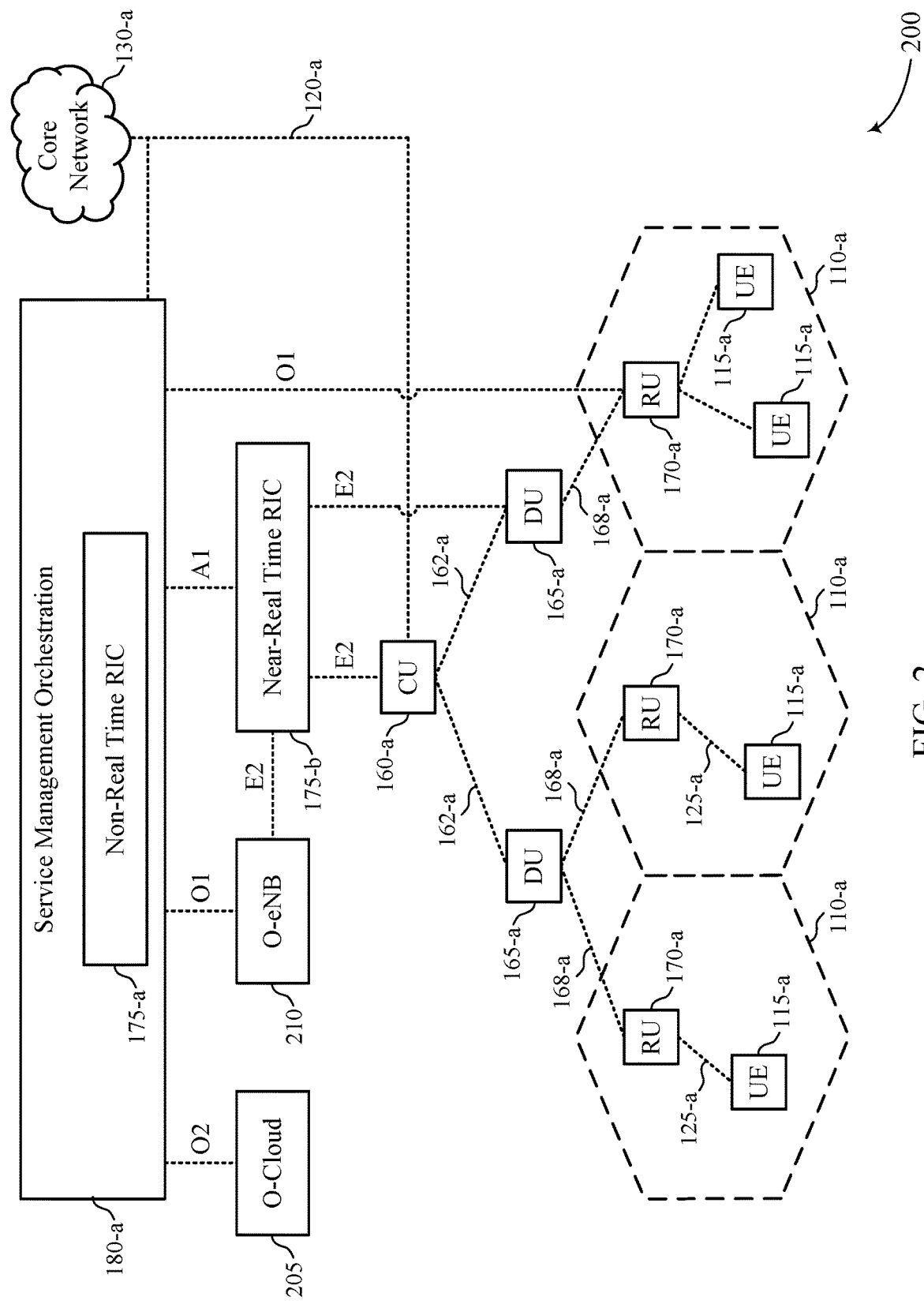
FIG. 2 illustrates an example of a network architecture that supports managing group configurations in wireless communications systems in accordance with one or more aspects of the present disclosure.

FIG. 2 illustrates an example of a network architecture 200 (e.g., a disaggregated base station architecture, a disaggregated RAN architecture) that supports managing group configurations in wireless communications systems in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
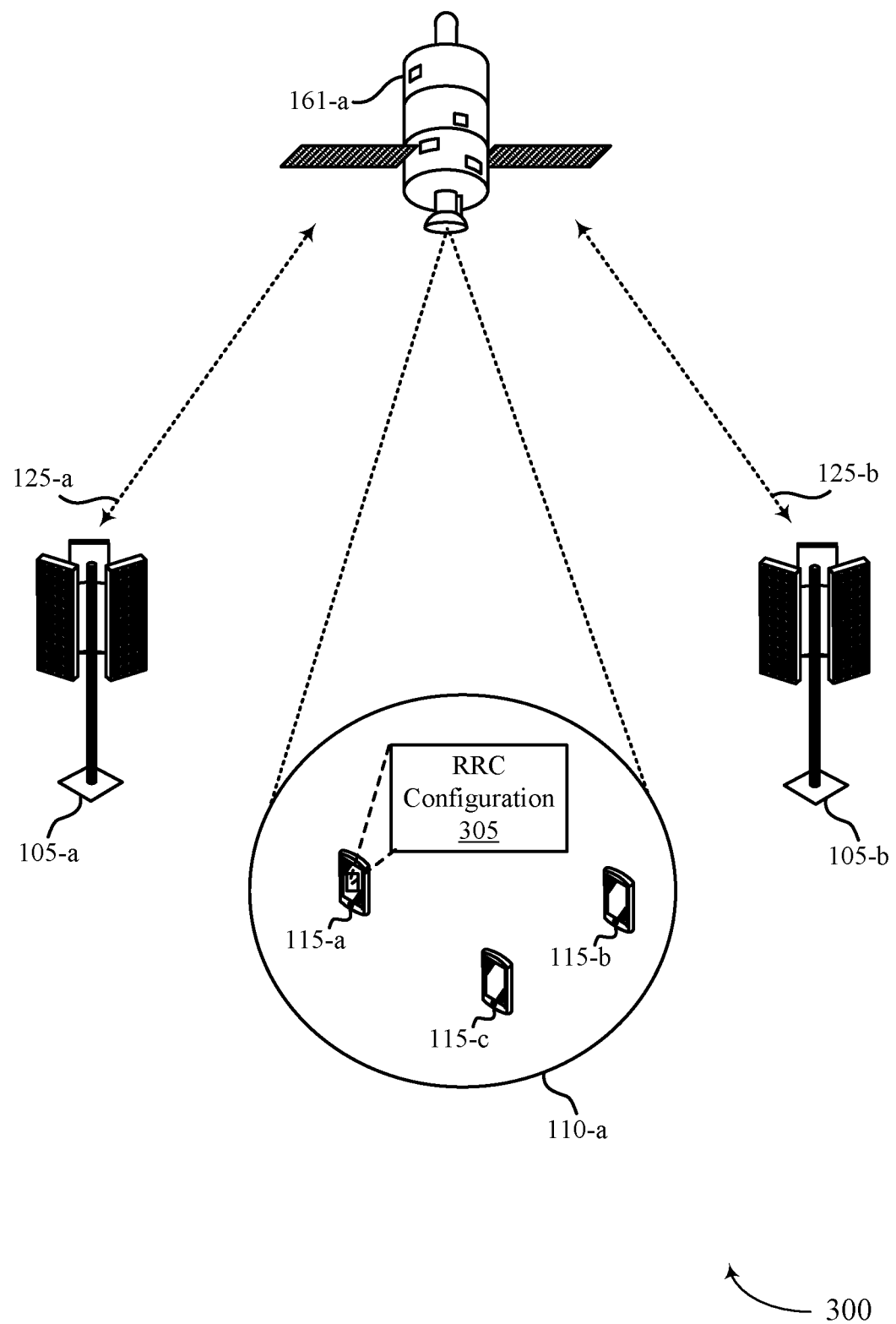
FIG. 3 illustrates an example of a wireless communications system that supports managing group configurations in wireless communications systems in accordance with one or more aspects of the present disclosure.

FIG. 3 illustrates an example of a wireless communications system 300 that supports managing group configurations in wireless communications systems in accordance with one or more aspects of the present disclosure. The wireless communications system 300 may implement or be implemented by aspects of the wireless communications system 100. For example, the wireless communications system 300 may include a network entity 105-*a*, a network entity 105-*b*, a group of UEs 115 (such as, a UE 115-*a*, a UE 115-*b*, and a UE 115-*c*), and a satellite 161-*a*, which may be examples of a network entity 105, a UE 115, and a satellite 161 as described with reference to FIG. 1. Additionally, or alternatively, the wireless communications system 300 may implement or be implemented by aspects of the network architecture 200 as described with reference to FIG. 2. The wireless communications system 300 may support multiple radio access technologies including 4G systems such as LTE systems, LTE-A systems, or LTE-A Pro systems, 5G systems, or other systems and radio technologies, including future systems and radio technologies not explicitly mentioned herein (e.g., 6G systems). The wireless communications system 300 may provide power saving and, in some examples, may promote higher reliability and lower latency wireless communication.

The satellite 161-*a* may support wireless communication with the network entity 105-*a* and the group of UEs 115 via a communication link 125-*a* (e.g., a feeder link), which may be an example of a communication link 125 as described with reference to FIG. 1. Alternatively, the satellite 161-*a* may support wireless communication with the network entity 105-*b* and the group of UEs 115 via a communication link 125-*b* (e.g., a feeder link), which may be an example of a communication link 125 as described with reference to FIG. 1. In the example of FIG. 3, the satellite 161-*a* may be moving at high-speeds relative to the network entity 105-*a* operating within the wireless communications system 300. In some cases, because the satellite 161-*a* may be moving at high-speeds relative to the network entity 105-*a* operating within the wireless communications system 300, the satellite 161-*a* may have to switch a communication link 125 (e.g., from a ground gateway, such as the network entity 105-*a* to the satellite 161-*a*) to continue to support wireless communications with the group of UEs 115 in the wireless communications system 300. For example, the network entity 105-*a* for the group of UEs 115 may become out of coverage for the satellite 161-*a* and, as a result, the satellite 161-*a* may have to connect to the network entity 105-*b* and handover the group of UEs 115 to the network entity 105-*b* and continue to support wireless communication with the group of UEs 115.

The network entity 105-*a* or the satellite 161-*a* may transmit (or output), to one or more UEs 115 of the group of UEs 115, an RRC configuration 305. The RRC configuration 305 may be a group RRC configuration, which may include group cell-specific parameters associated with the network entity 105-*b* (e.g., a target cell). Additionally, the group RRC configuration may include a UE-specific configuration associated with one or more UEs of the group of UEs 115, such as a discontinues reception (DRX) parameters, hybrid automatic repeat request (HARQ) parameters (e.g., packet data convergence protocol (PDCP) parameters, radio link control (RLC) parameters, medium access control (MAC) parameters, etc.), among other examples. In some examples, the first UE-group configuration may be received in a logical channel configured with an RLC transparent mode or a default signaling radio bearer configuration, or both.

The network entity 105-*a* may transmit (or output), to one or more UEs 115 of the group of UEs 115, the RRC configuration 305 in a downlink data channel scheduled by a downlink control channel. For example, the network entity 105-*a* may transmit (or output), to one or more UEs 115 of the group of UEs 115, the group RRC configuration in a physical downlink shared channel (PDSCH) scheduled by a physical downlink control channel (PDCCH). In some examples, the RRC configuration 305 may be associated with a group radio network temporary identifier (RNTI). The RNTI may be a multibit identifier used by the network entity 105-*a* to identify the group of UEs 115. In some other examples, the RRC configuration 305 may be associated with a system information RNTI (SI-RNTI) or other preconfigured scheduling information. The network entity 105-*a* and the group of UEs 115 may use a transparent mode (TM) for processing (e.g., receiving and transmitting) the RRC configuration 305.

The network entity 105-*b* (e.g., the target cell) may broadcast system information, which may include one or more of the above example parameters. In some examples, the RRC configuration 305 (e.g., the group RRC configuration) may exclusively include the same parameters broadcasted by the network entity 105-*b* (e.g., the target cell) in the system information (e.g., cell specific and ephemeris). In this example, no protection may be required for the RRC configuration 305.

In some examples, one or more UEs 115 of the group of UEs 115 may receive a hash value or a cyclic redundancy check (CRC) associated with a default RRC configuration via a UE-specific RRC configuration (e.g., a handover command). If there is any change or the CRC check fails after receiving the UE-specific RRC configuration, one or more UEs 115 of the group of UEs 115 may determine that the RRC configuration 305 is compromised (e.g., noncompliant).

The network entity 105-*a* or the satellite 161-*a* may configure a RNTI value for the group of UEs 115. For example, the configured RNTI value may be for transmitting and receiving the RRC configuration 305 using a downlink data channel (e.g., a PDSCH) scheduled by a downlink control channel (e.g., a PDCCH). The network entity 105-*a* or the satellite 161-*a* may transmit a broadcast message based on scheduling information or a scheduling time window provided to the group of UEs 115. In some examples, the network entity 105-*a* or the satellite 161-*a* may configure the group of UEs 115 with a search space (e.g., a PDCCH search space), which the group of UEs 115 may use for receiving and decoding the PDCCH together with a group RNTI. The group of UEs 115 may monitor the group RNTI together with the C-RNTI or at a preconfigured periodicity.

In some examples, one or more UEs 115 of the group of UEs 115 may generate a hash value or perform a CRC check of the received RRC configuration 305 (e.g., a group RRC configuration). One or more UEs 115 of the group of UEs 115 may include the generated hash value or an indication of a result of the CRC check in a handover complete message to the network entity 105-*b* (e.g., a target cell). If the network entity 105-*b* (e.g., the target cell) determines the RRC configuration 305 (e.g., a group RRC configuration) may have been compromised, the network entity 105-*b* may provide a new RRC reconfiguration message to one or more UEs 115 of the group of UEs 115.

In some examples, one or more UEs 115 of the group of UEs 115 may randomly select a parameter from the received RRC configuration 305 (e.g., the group RRC configuration) and include the selected parameter in a handover complete message to the network entity 105-*b* (e.g., a target cell) for verification. If there is mismatch from at least one UE 115 or a quantity of UEs 115 of the group of UEs 115 reported parameter values, the network entity 105-*b* may determine the RRC configuration 305 (e.g., the group RRC configuration) may have been compromised and reconfigure the UE 115 or the quantity of UEs 115 of the group of UEs 115.

One or more UEs 115 of the group of UEs 115, including one or more of the UE 115-*a*, the UE 115-*b*, or the UE 115-*c* may receive an RRC configuration 305 from the network entity 105-*a*, the network entity 105-*b*, or the satellite 161-*a*. For example, one or more of network entity 105-*a*, the network entity 105-*b*, or the satellite 161-*a* may transmit or broadcast the RRC configuration 305 to one or more UEs 115 of the group of UEs 115 in the wireless communications system 300. One or more UEs 115 of the group of UEs 115 may determine a trust status associated with the received RRC configuration 305 for the group of UEs 115. For example, one or more UEs 115 of the group of UEs 115 may perform an integrity protection operation (e.g., an integrity protection check failure operation) for the received RRC configuration 305. One or more UEs 115 of the group of UEs 115 may detect that the received RRC configuration 305 has been compromised based on the performed integrity protection operation.

In some examples, based on the determination, one or more UEs 115 of the group of UEs 115 may be reconfigured with a new RRC configuration by the network entity 105-*a*, the network entity 105-*b*, or the satellite 161-*a*. In other examples, based on the determination, one or more UEs 115 of the group of UEs 115 may transmit, to the network entity 105-*a*, the network entity 105-*b*, or the satellite 161-*a*, an indication indicating the trust status associated with the received RRC configuration 305. For example, one or more UEs 115 of the group of UEs 115 may indicate to the network entity 105-*a*, the network entity 105-*b*, or the satellite 161-*a* that received RRC configuration 305 has been compromised. As a result, one or more of the network entity 105-*a*, the network entity 105-*b*, or the satellite 161-*a* may transmit a new RRC configuration to the group of UEs 115. Additionally, or alternatively, in some other examples, based on the determination, one or more UEs 115 of the group of UEs 115 initiate an RRC reestablishment procedure with the network entity 105-*b* (e.g., a target cell).

One or more of UEs 115 of the group of UEs 115 may perform a handover from the network entity 105-*a* to the network entity 105-*b*. In some examples, one or more of UEs 115 of the group of UEs 115 may perform the handover based on the received RRC configuration 305, which may be a default RRC configuration or a group RRC configuration. One or more of UEs 115 of the group of UEs 115 may complete the handover to the network entity 105-*b* (e.g., the target cell) using the default RRC configuration or the group RRC configuration. In some cases, the received RRC configuration 305 may be absent of an indication (e.g., a master key update) for a modification of one or more security keys, such as AS security keys. In some cases, a handover command may reset one or more security configurations (e.g., security keys) for one or more of the UEs 115 of the group of UEs 115 based on the handover.

One or more of the UEs 115 of the group of UEs 115 may include an indication, in a handover complete message, of whether the UEs 115 used the default RRC configuration or the group RRC configuration. If the default RRC configuration is used, the network entity 105-*b* (e.g., the target cell) may transmit to one or more of the UEs 115 of the group of UEs 115 a correct RRC reconfiguration. The network entity 105-*b* may refresh security keys (e.g., master key update) and perform wireless communication with one or more of the UEs 115 of the group of UEs 115. Alternatively, if the group RRC configuration is used, one or more of the UEs 115 of the group of UEs 115 may acquire a system information block (SIB) (e.g., a SIB1) from the network entity 105-*b* (e.g., the target cell). In some examples, one or more of the UEs 115 of the group of UEs 115 may also acquire a non-terrestrial network specific SIB, for example, from the satellite 161-*a*, and transmit a handover complete message to the network entity 105-*b*. In some cases, for UE-specific parameters provided, one or more of the UEs 115 of the group of UEs 115 may use default parameters or determine that these parameters are not configured. One or more of the UEs 115 of the group of UEs 115 may indicate this in the handover complete message to the network entity 105-*b*.

The network entity 105-*b* or the satellite 161-*a* may receive (or obtain) from one or more of the UEs 115 of the group of UEs 115 a message including one or more parameters of the group RRC configuration. For example, the network entity 105-*b* or the satellite 161-*a* may receive (or obtain) from one or more of the UEs 115 of the group of UEs 115 a handover complete message including a report of the one or more parameters of the group RRC configuration. In some examples, prior to a handover (e.g., during handover preparation), the network entity 105-*b* or the satellite 161-*a* may receive (or obtain) from the network entity 105-*a* a message including one or more parameters of the group RRC configuration. The network entity 105-*b* or the satellite 161-*a* may request the network entity 105-*a* to verify the one or more parameters (e.g., HARQ or CRC check) after receiving the message from one or more of the UEs 115 of the group of UEs 115. The network entity 105-*b* may provide correct group RRC reconfiguration message to the one or more of the UEs 115 of the group of UEs 115 using a group RNTI. One or more of the UEs 115 of the group of UEs 115 may be requested to read system information to acquire the group RRC configuration and other correct UE-specific configuration can be provided via RRC messaging.

Figure 4:
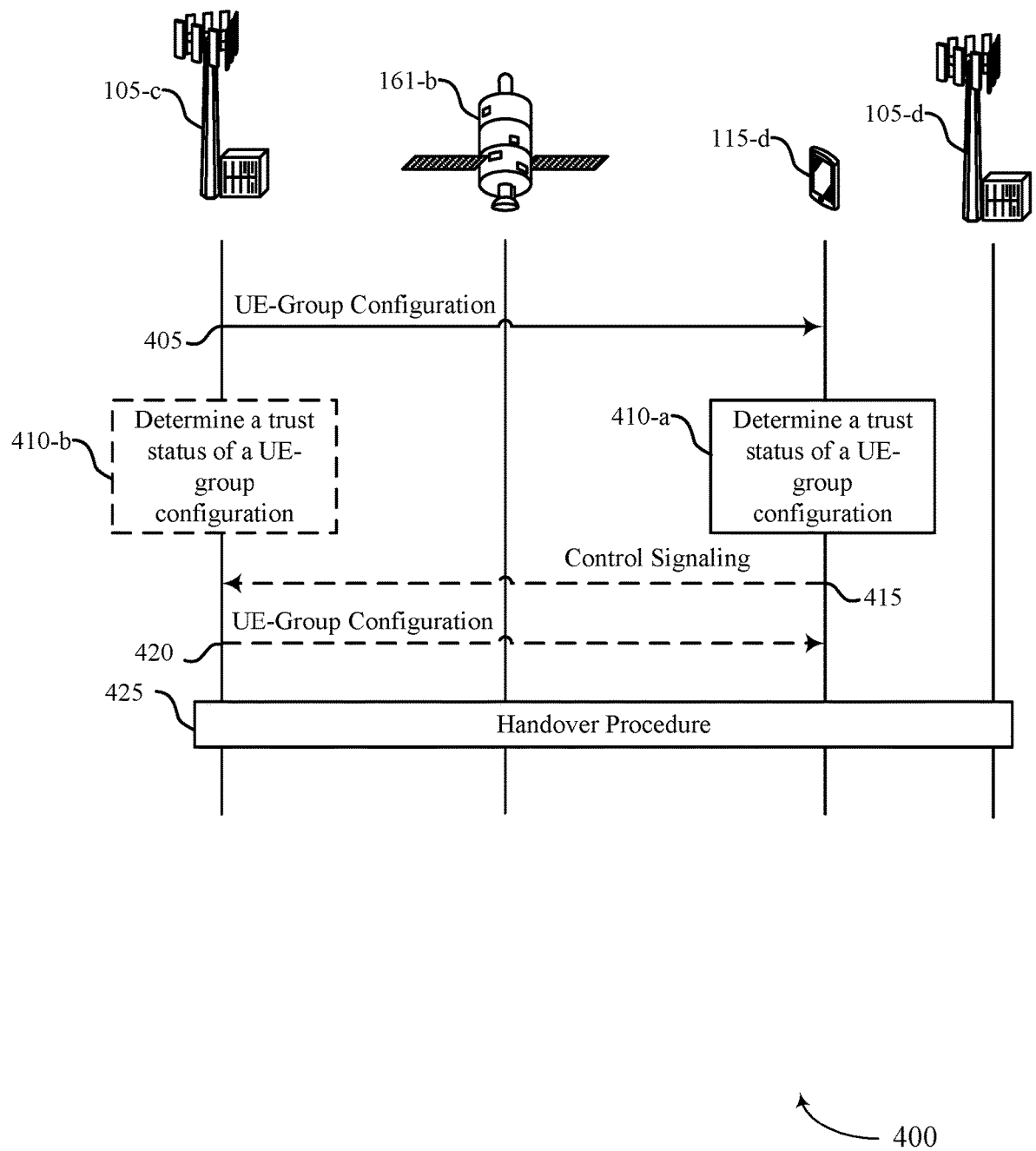
FIG. 4 illustrates an example of a process flow that supports managing group configurations in wireless communications systems in accordance with one or more aspects of the present disclosure.

FIG. 4 illustrates an example of a process flow 400 that supports managing group configurations in wireless communications systems in accordance with one or more aspects of the present disclosure. In some examples, the process flow 400 may implement or be implemented by aspects of the wireless communications system 100 and the wireless communications system 300 as described with reference to FIGS. 1 and 3. For example, the process flow 400 may be implemented by a network entity 105-*c*, a network entity 105-*d*, a satellite 161-*b*, and a UE 115-*d*, which may be an example of a network entity 105, a satellite 161, and a UE 115 as described with reference to FIGS. 1 and 3. Additionally, the process flow 400 may implement or be implemented by aspects of the network architecture 200 as described with reference to FIG. 2.

In the following description of the process flow 400, the operations between the network entity 105-*c*, the network entity 105-*d*, the satellite 161-*b*, and the UE 115-*d* may be transmitted in a different order than the example order shown, or the operations performed by the network entity 105-*c*, the network entity 105-*d*, the satellite 161-*b*, and the UE 115-*d* may be performed in different orders or at different times. Some operations may also be omitted from the process flow 400, and other operations may be added to the process flow 400.

At 405, the network entity 105-*c* or the satellite 161-*b* may transmit a UE-group configuration associated with a target network node (e.g., the network entity 105-*d*). For example, the network entity 105-*c* or the satellite 161-*b* may broadcast an RRC message including the UE-group configuration associated with the network entity 105-*d*. In some examples, the RRC message may also include UE-specific configuration including integrity information for the UE-group configuration.

At 410-*a*, the UE 115-*d* may determine a trust status of the UE-group configuration. For example, the UE 115-*d* may perform an integrity check of the UE-group configuration to obtain the trust status of the UE-group configuration. In some examples, the UE 115-*d* may determine a change in a hash value or a CRC associated with the UE-group configuration based on the UE-specific configuration. The integrity information may include the hash value or the CRC. Optionally, at 410-*b*, the network entity 105-*c* or the satellite 161-*b* may also determine a trust status of the UE-group configuration as described herein.

At 415, the UE 115-*d* may, optionally, transmit, to the network entity 105-*c* or the satellite 161-*b*, an indication of the trust status of the UE-group configuration. For example, the UE 115-*d* may indicate that the UE-group configuration has been compromised. At 420, the network entity 105-*c* or the satellite 161-*b* may, optionally, transmit a new UE-group configuration associated with the target network node (e.g., the network entity 105-*d*), for example, based on the indication that the previous UE-group configuration has been compromised.

At 425, the network entity 105-*c*, the satellite 161-*b*, the UE 115-*d*, or the network entity 105-*d*, or any combination thereof may perform a handover procedure. For example, a handover from the network entity 105-*c* to the network entity 105-*d*.

Figure 5:
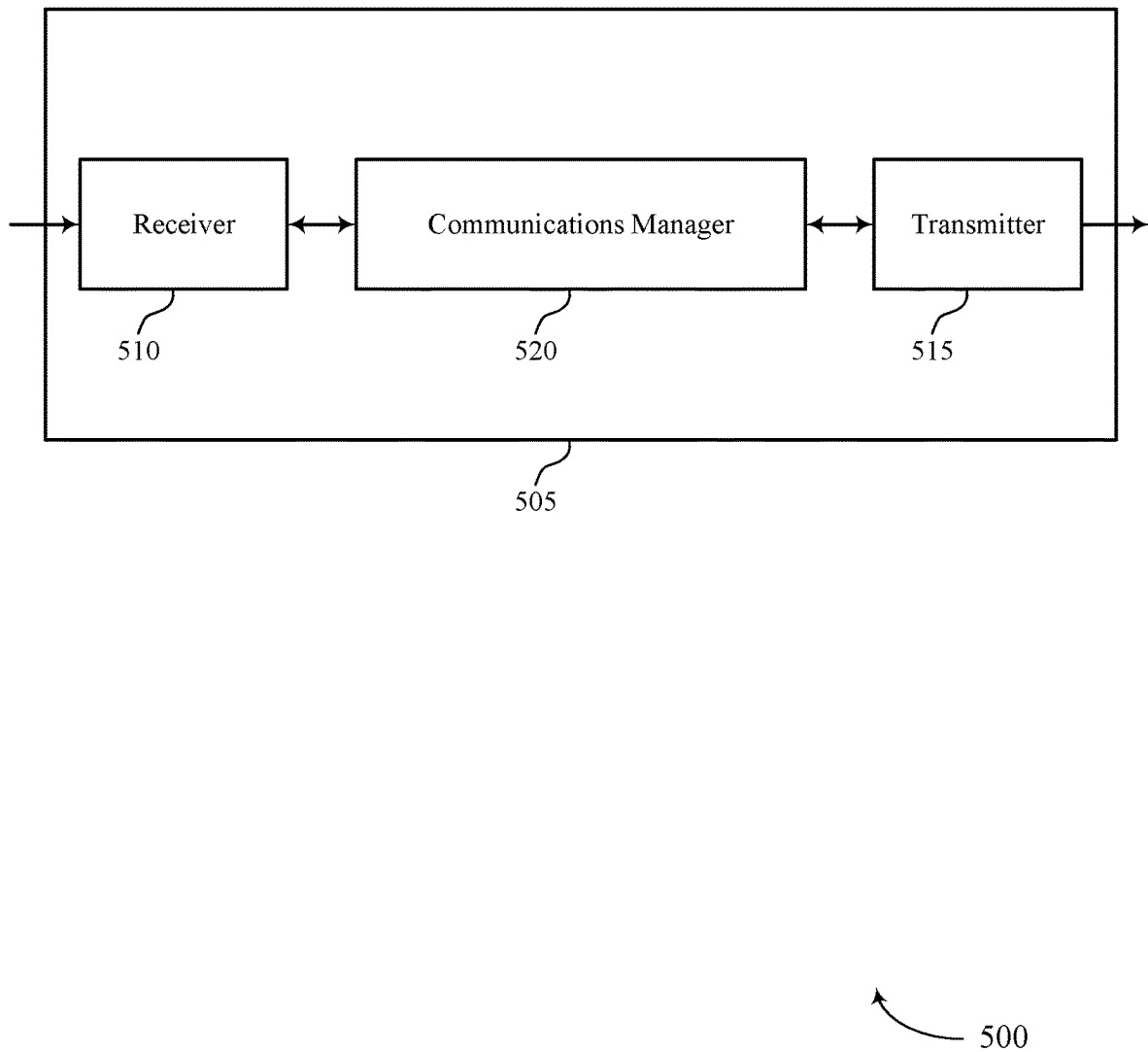
FIGS. 5 and 6 show block diagrams of devices that support managing group configurations in wireless communications systems in accordance with one or more aspects of the present disclosure.

FIG. 5 shows a block diagram 500 of a device 505 that supports managing group configurations in wireless communications systems in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to managing group configurations in wireless communications systems). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to managing group configurations in wireless communications systems). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of managing group configurations in wireless communications systems as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at the device 505 (e.g., a UE) in accordance with examples as disclosed herein. For example, the communications manager 520 may be configured as or otherwise support a means for receiving first control signaling indicating a configuration associated with a target network node in a non-terrestrial network, the configuration including a first UE-group configuration and a UE-specific configuration including integrity information for the first UE-group configuration. The communications manager 520 may be configured as or otherwise support a means for performing a connection operation based on a trust status of the first UE-group configuration.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption.

Figure 6:
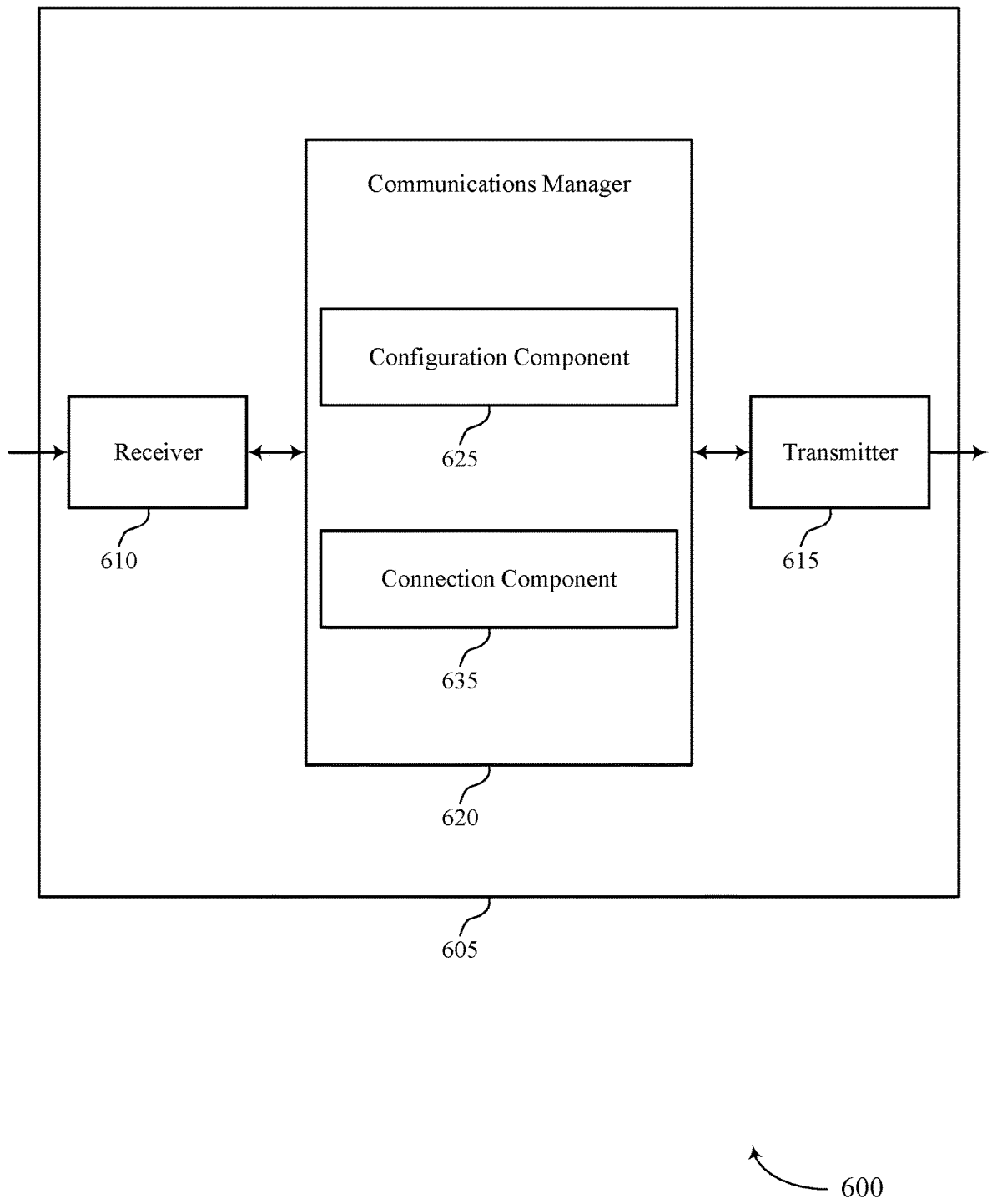

FIG. 6 shows a block diagram 600 of a device 605 that supports managing group configurations in wireless communications systems in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to managing group configurations in wireless communications systems). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to managing group configurations in wireless communications systems). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of managing group configurations in wireless communications systems as described herein. For example, the communications manager 620 may include a configuration component 625, a connection component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at the device 605 (e.g., a UE) in accordance with examples as disclosed herein. The configuration component 625 may be configured as or otherwise support a means for receiving first control signaling indicating a configuration associated with a target network node in a non-terrestrial network, the configuration including a first UE-group configuration and a UE-specific configuration including integrity information for the first UE-group configuration. The connection component 635 may be configured as or otherwise support a means for performing a connection operation based on a trust status of the first UE-group configuration.

Figure 7:
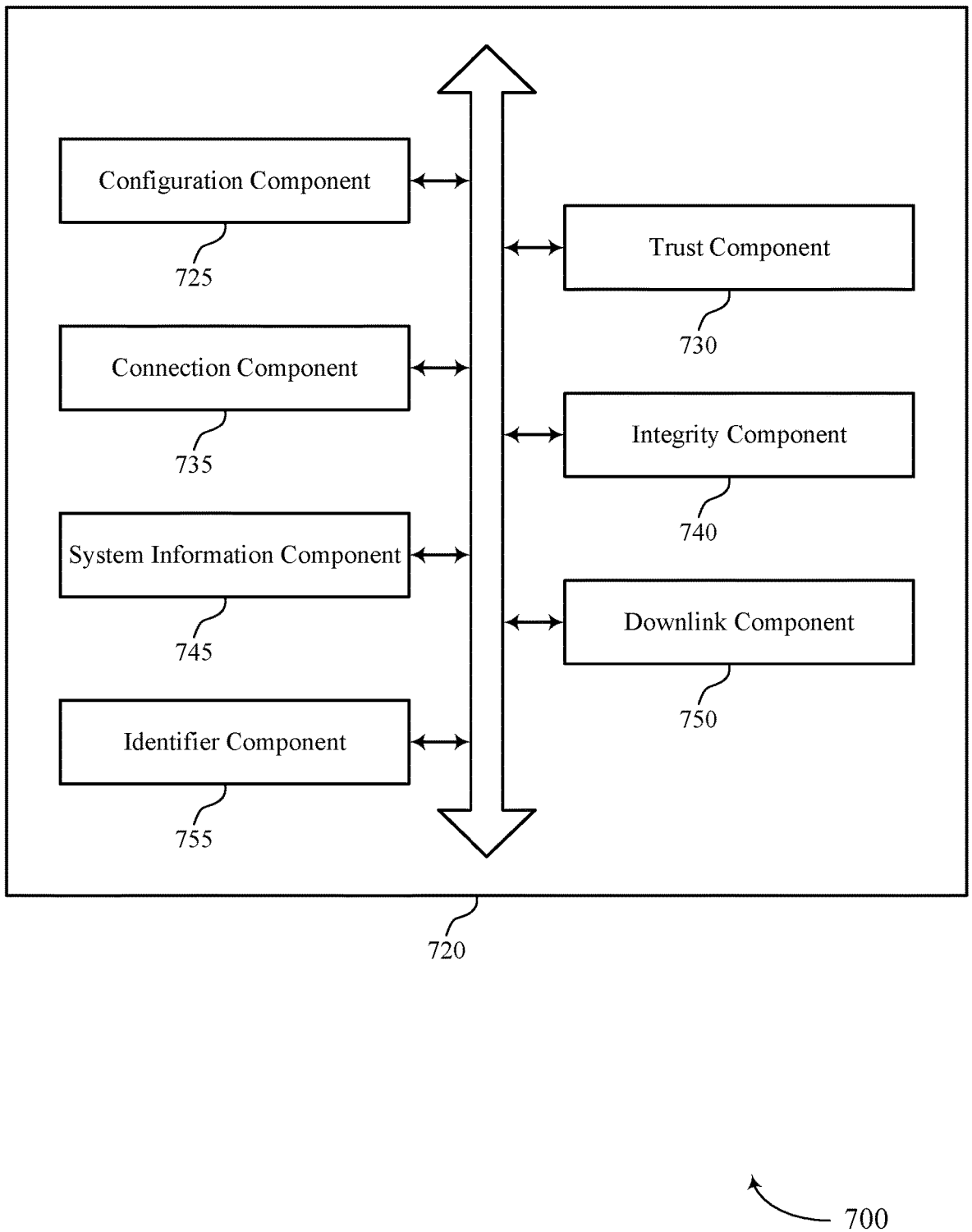
FIG. 7 shows a block diagram of a communications manager that supports managing group configurations in wireless communications systems in accordance with one or more aspects of the present disclosure.

FIG. 7 shows a block diagram 700 of a communications manager 720 that supports managing group configurations in wireless communications systems in accordance with one or more aspects of the present disclosure. The communications manager 720 may be an example of aspects of a communications manager 520, a communications manager 620, or both, as described herein. The communications manager 720, or various components thereof, may be an example of means for performing various aspects of managing group configurations in wireless communications systems as described herein. For example, the communications manager 720 may include a configuration component 725, a trust component 730, a connection component 735, an integrity component 740, a system information component 745, a downlink component 750, an identifier component 755, or any combination thereof. Each of these components may communicate, directly or indirectly, with one another (e.g., via one or more buses).

The communications manager 720 may support wireless communication at a UE in accordance with examples as disclosed herein. The configuration component 725 may be configured as or otherwise support a means for receiving first control signaling indicating a configuration associated with a target network node in a non-terrestrial network, the configuration including a first UE-group configuration and a UE-specific configuration including integrity information for the first UE-group configuration. The connection component 735 may be configured as or otherwise support a means for performing a connection operation based on a trust status of the first UE-group configuration.

In some examples, the integrity component 740 may be configured as or otherwise support a means for performing an integrity check of the first UE-group configuration to obtain the trust status of the first UE-group configuration. In some examples, the connection component 735 may be configured as or otherwise support a means for where performing the connection operation is based on the integrity check of the first UE-group configuration, and where the connection operation includes a handover from a source network node to the target network node in the non-terrestrial network.

In some examples, to support performing the integrity check of the first UE-group configuration, the integrity component 740 may be configured as or otherwise support a means for determining a change in a hash value or a CRC associated with the first UE-group configuration based on the UE-specific configuration, where the integrity information including the hash value or the CRC.

In some examples, the integrity component 740 may be configured as or otherwise support a means for performing a post integrity check operation based on the trust status of the first UE-group configuration.

In some examples, to support performing the connection operation, the connection component 735 may be configured as or otherwise support a means for triggering a reestablishment connection operation to the target network node based on the trust status of the first UE-group configuration.

In some examples, the trust component 730 may be configured as or otherwise support a means for transmitting second control signaling indicating the trust status of the first UE-group configuration. In some examples, the configuration component 725 may be configured as or otherwise support a means for receiving third control signaling indicating a second UE-group configuration based on the trust status of the first UE-group configuration according to the integrity information. In some examples, the connection component 735 may be configured as or otherwise support a means for performing the connection operation based on the second UE-group configuration.

In some examples, the integrity component 740 may be configured as or otherwise support a means for generating a hash value or a CRC associated with the first UE-group configuration. In some examples, the integrity component 740 may be configured as or otherwise support a means for transmitting second control signaling indicating the hash value or the CRC associated with the first UE-group configuration, the second control signaling including a handover complete message.

In some examples, the configuration component 725 may be configured as or otherwise support a means for selecting one or more parameters associated with the first UE-group configuration. In some examples, the configuration component 725 may be configured as or otherwise support a means for transmitting second control signaling indicating the one or more parameters associated with the first UE-group configuration.

In some examples, the configuration excludes a master security key update.

In some examples, the configuration component 725 may be configured as or otherwise support a means for transmitting second control signaling indicating whether the first UE-group configuration includes a common configuration or a default configuration. In some examples, the connection component 735 may be configured as or otherwise support a means for performing the connection operation based on the second control signaling.

In some examples, the system information component 745 may be configured as or otherwise support a means for receiving a SIB associated with the target network node and a non-terrestrial network-specific SIB associated with a network entity in the non-terrestrial network. In some examples, the connection component 735 may be configured as or otherwise support a means for transmitting second control signaling indicating a handover complete, where performing the connection operation is based on the second control signaling.

In some examples, the downlink component 750 may be configured as or otherwise support a means for receiving a DCI over a PDCCH, the DCI scheduling a physical downlink shared channel, the DCI including a G-RNTI or a SI-RNTI for the integrity information. In some examples, the configuration component 725 may be configured as or otherwise support a means for receiving the first control signaling indicating the configuration associated with the target network node in the non-terrestrial network is based on the DCI.

In some examples, the downlink component 750 may be configured as or otherwise support a means for determining a time interval for receiving the PDCCH based on scheduling information. In some examples, the downlink component 750 may be configured as or otherwise support a means for receiving the DCI over the PDCCH during the time interval.

In some examples, the downlink component 750 may be configured as or otherwise support a means for determining a PDCCH search space for receiving the PDCCH based on a search space configuration associated with a group of UEs. In some examples, the downlink component 750 may be configured as or otherwise support a means for receiving the DCI over the PDCCH based on the PDCCH search space.

In some examples, the identifier component 755 may be configured as or otherwise support a means for monitoring the G-RNTI or a C-RNTI based on a periodicity. In some examples, the downlink component 750 may be configured as or otherwise support a means for where receiving the DCI over the PDCCH is based on the G-RNTI or the C-RNTI.

In some examples, the first UE-group configuration includes one or more cell-specific parameters associated with the target network node.

In some examples, the one or more cell-specific parameters include one or more broadcast cell-specific parameters of a system information associated with the target network node.

In some examples, the UE-specific configuration includes one or more UE-specific parameters associated with a group of UEs in the non-terrestrial network.

In some examples, the one or more UE-specific parameters includes a DRX parameter, an HARQ parameter, a PDCP parameter, an RLC parameter, or a MAC parameter, or a combination thereof.

In some examples, the configuration component 725 may be configured as or otherwise support a means for receiving the first UE-group configuration in a logical channel associated with a RLC transparent mode or a signaling radio bearer configuration, or both.

In some examples, the first UE-group configuration includes a common configuration or a default configuration.

Figure 8:
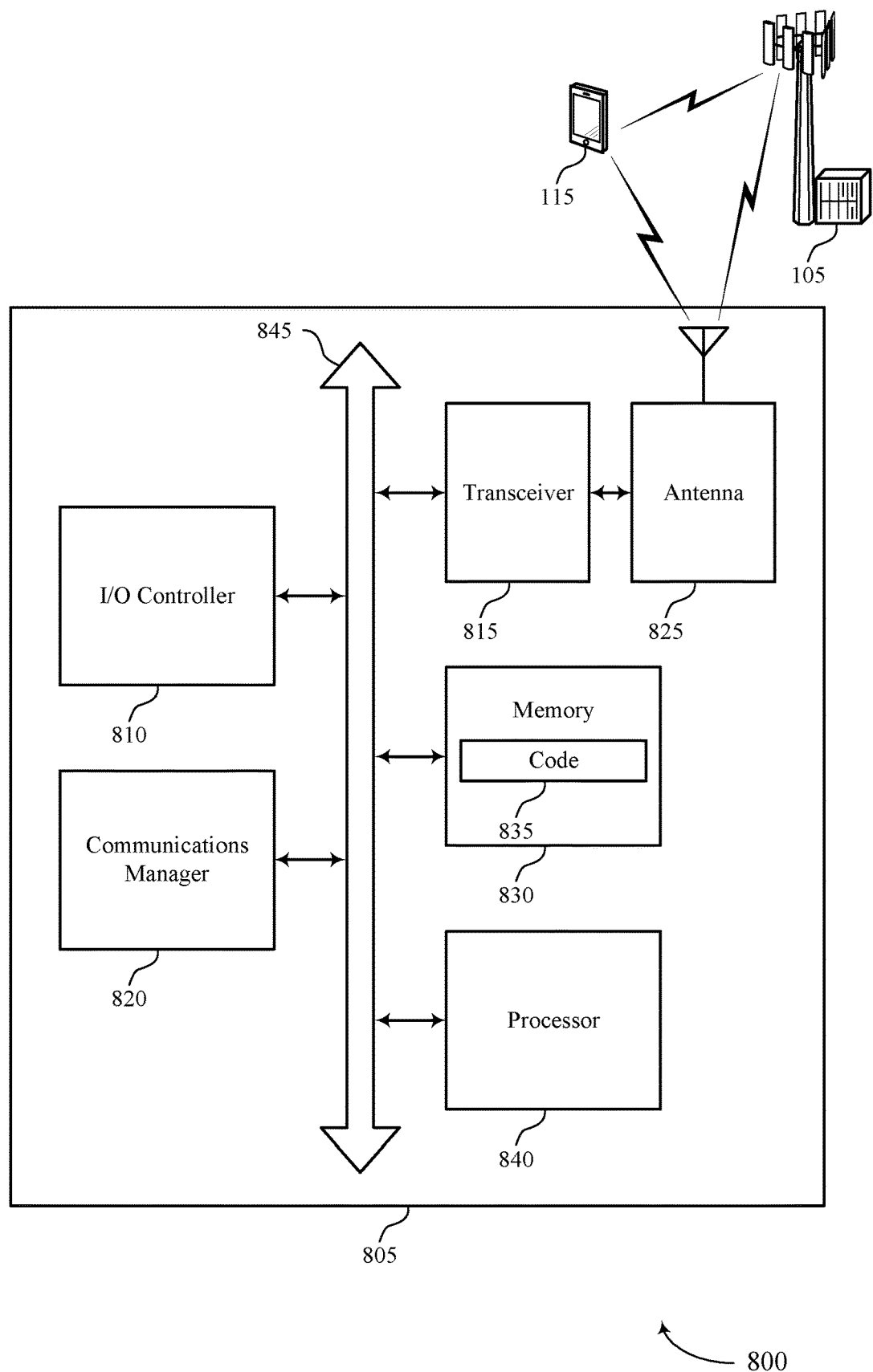
FIG. 8 shows a diagram of a system including a device that supports managing group configurations in wireless communications systems in accordance with one or more aspects of the present disclosure.

FIG. 8 shows a diagram of a system 800 including a device 805 that supports managing group configurations in wireless communications systems in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting managing group configurations in wireless communications systems). For example, the device 805 or a component of the device 805 may include a processor 840 and memory 830 coupled with or to the processor 840, the processor 840 and memory 830 configured to perform various functions described herein.

The communications manager 820 may support wireless communication at the device 805 (e.g., a UE) in accordance with examples as disclosed herein. For example, the communications manager 820 may be configured as or otherwise support a means for receiving first control signaling indicating a configuration associated with a target network node in a non-terrestrial network, the configuration including a first UE-group configuration and a UE-specific configuration including integrity information for the first UE-group configuration. The communications manager 820 may be configured as or otherwise support a means for performing a connection operation based on a trust status of the first UE-group configuration.

By including or configuring the communications manager 820 in accordance with examples as described herein, the device 805 may support techniques for improved communication reliability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of managing group configurations in wireless communications systems as described herein, or the processor 840 and the memory 830 may be otherwise configured to perform or support such operations.

Figure 9:
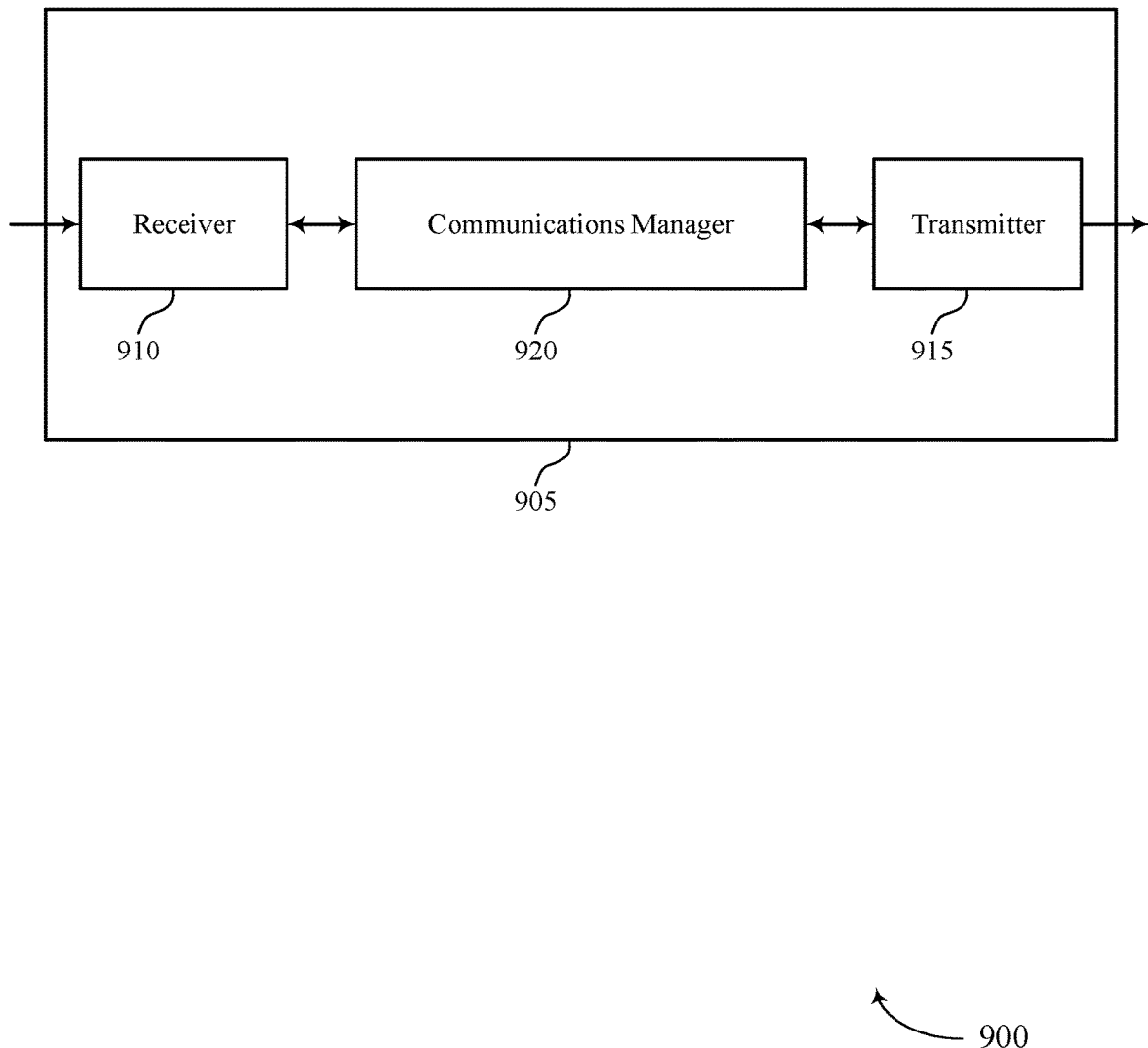
FIGS. 9 and 10 show block diagrams of devices that support managing group configurations in wireless communications systems in accordance with one or more aspects of the present disclosure.

FIG. 9 shows a block diagram 900 of a device 905 that supports managing group configurations in wireless communications systems in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of managing group configurations in wireless communications systems as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at the device 905 (e.g., a network entity) in accordance with examples as disclosed herein. For example, the communications manager 920 may be configured as or otherwise support a means for transmitting first control signaling indicating a configuration associated with a target network node in a non-terrestrial network, the configuration including a first UE-group configuration and a UE-specific configuration including integrity information for the first UE-group configuration. The communications manager 920 may be configured as or otherwise support a means for performing a connection operation based on a trust status of the first UE-group configuration.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced power consumption.

Figure 10:
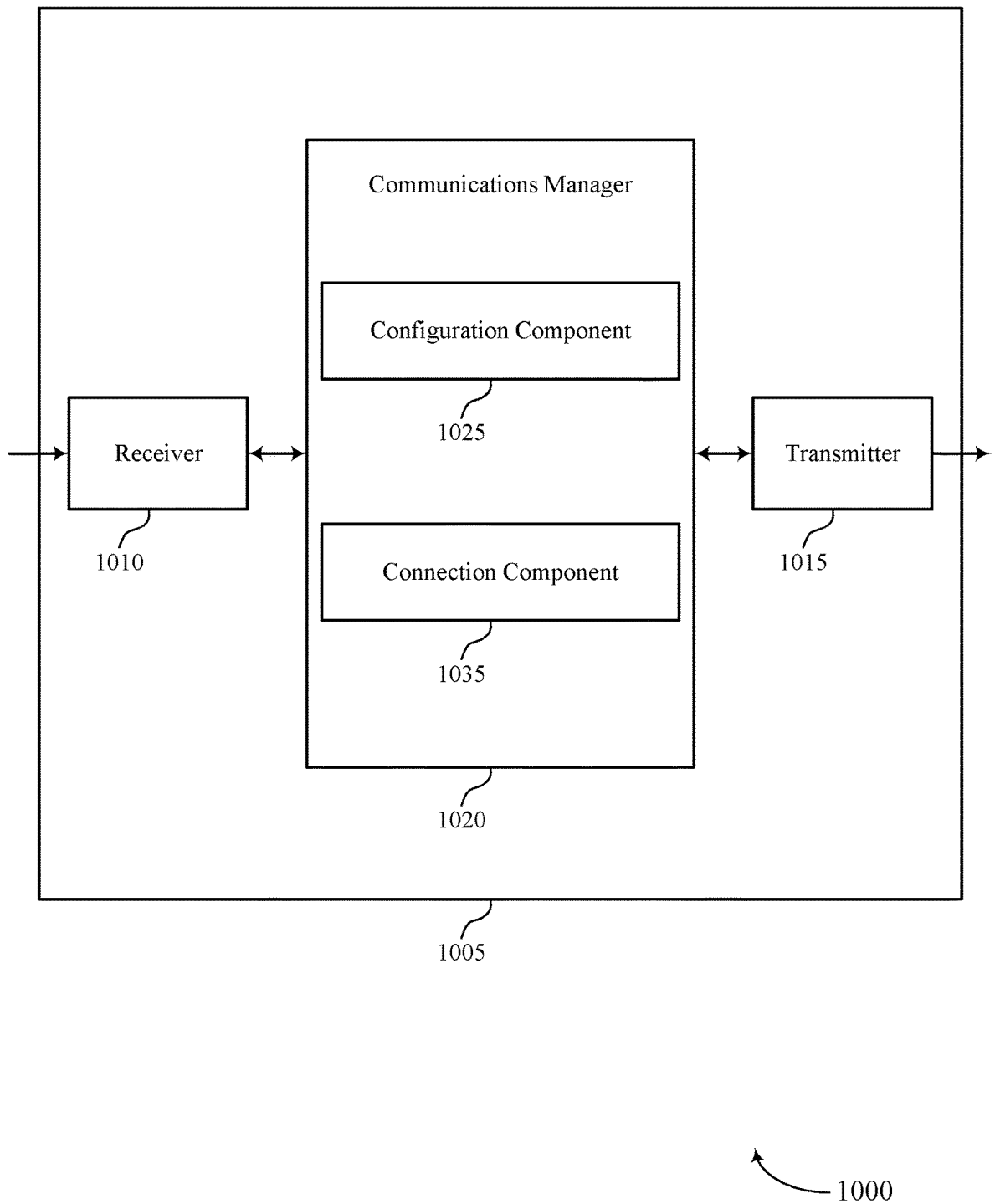

FIG. 10 shows a block diagram 1000 of a device 1005 that supports managing group configurations in wireless communications systems in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of managing group configurations in wireless communications systems as described herein. For example, the communications manager 1020 may include a configuration component 1025, a connection component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at the device 1005 (e.g., a network entity) in accordance with examples as disclosed herein. The configuration component 1025 may be configured as or otherwise support a means for transmitting first control signaling indicating a configuration associated with a target network node in a non-terrestrial network, the configuration including a first UE-group configuration and a UE-specific configuration including integrity information for the first UE-group configuration. The connection component 1035 may be configured as or otherwise support a means for performing a connection operation based on a trust status of the first UE-group configuration.

Figure 11:
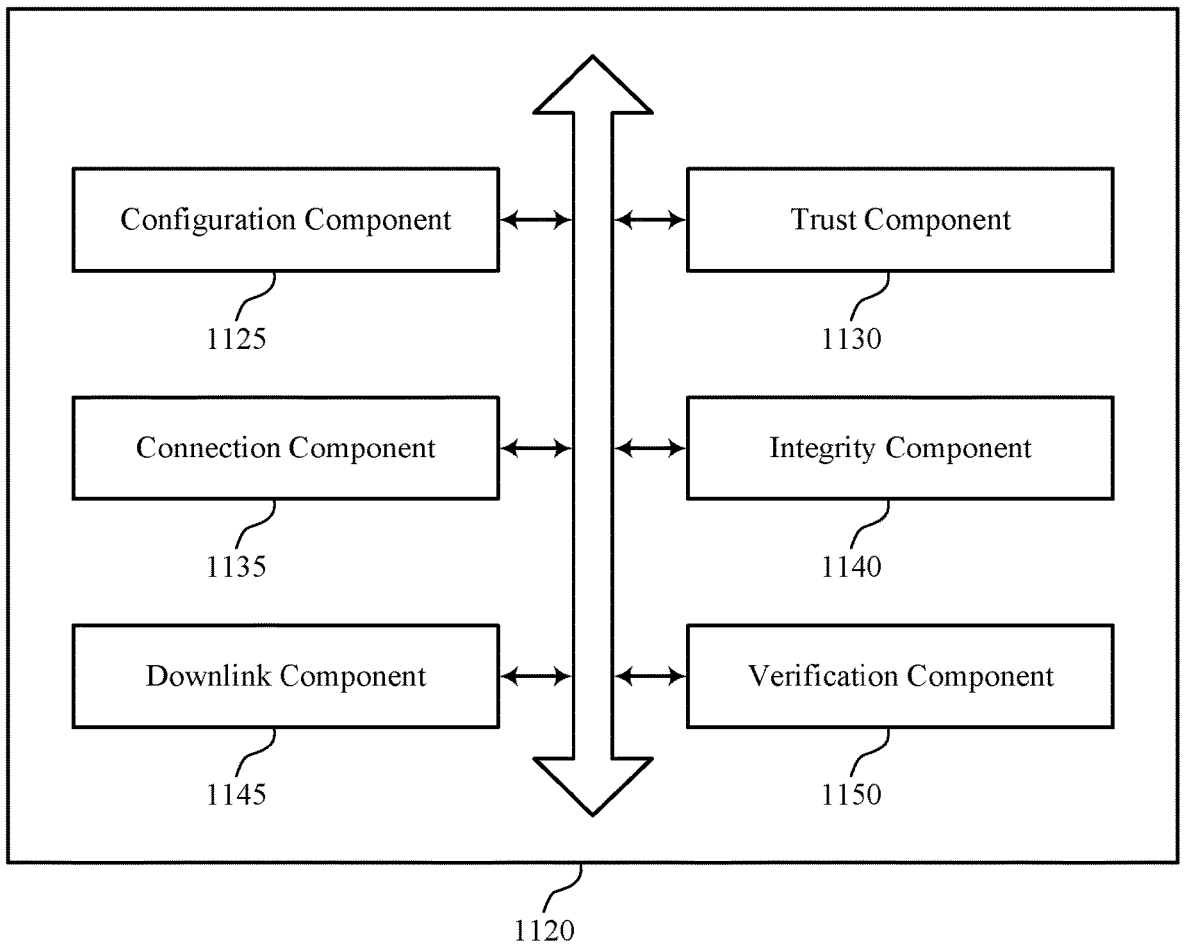
FIG. 11 shows a block diagram of a communications manager that supports managing group configurations in wireless communications systems in accordance with one or more aspects of the present disclosure.

FIG. 11 shows a block diagram 1100 of a communications manager 1120 that supports managing group configurations in wireless communications systems in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of managing group configurations in wireless communications systems as described herein. For example, the communications manager 1120 may include a configuration component 1125, a trust component 1130, a connection component 1135, an integrity component 1140, a downlink component 1145, a verification component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The configuration component 1125 may be configured as or otherwise support a means for transmitting first control signaling indicating a configuration associated with a target network node in a non-terrestrial network, the configuration including a first UE-group configuration and a UE-specific configuration including integrity information for the first UE-group configuration. The connection component 1135 may be configured as or otherwise support a means for performing a connection operation based on a trust status of the first UE-group configuration.

In some examples, the integrity component 1140 may be configured as or otherwise support a means for performing an integrity check of the first UE-group configuration to obtain the trust status of the first UE-group configuration. In some examples, the connection component 1135 may be configured as or otherwise support a means for where performing the connection operation is based on the integrity check of the first UE-group configuration.

In some examples, the integrity component 1140 may be configured as or otherwise support a means for receiving second control signaling indicating a change to a hash value or a CRC associated with the first UE-group configuration. In some examples, the configuration component 1125 may be configured as or otherwise support a means for transmitting third control signaling indicating a second UE-group configuration based on the trust status of the first UE-group configuration according to the integrity information.

In some examples, the configuration component 1125 may be configured as or otherwise support a means for receiving second control signaling indicating one or more parameters associated with the first UE-group configuration.

In some examples, the verification component 1150 may be configured as or otherwise support a means for receiving a request to verify the one or more parameters associated with the first UE-group configuration. In some examples, the trust component 1130 may be configured as or otherwise support a means for determining the trust status of the first UE-group configuration based on verifying the one or more parameters associated with the first UE-group configuration.

In some examples, the one or more parameters includes a DRX parameter, an HARQ parameter, a PDCP parameter, an RLC parameter, or a MAC parameter, or a combination thereof.

In some examples, the configuration component 1125 may be configured as or otherwise support a means for transmitting the first UE-group configuration in a logical channel associated with an RLC transparent mode or a signaling radio bearer configuration, or both.

In some examples, the downlink component 1145 may be configured as or otherwise support a means for transmitting DCI over a PDCCH, the DCI scheduling a physical downlink shared channel, the DCI including a G-RNTI or a SI-RNTI for the integrity information.

In some examples, transmitting the second control signaling indicating the second UE-group configuration is based on a G-RNTI.

Figure 12:
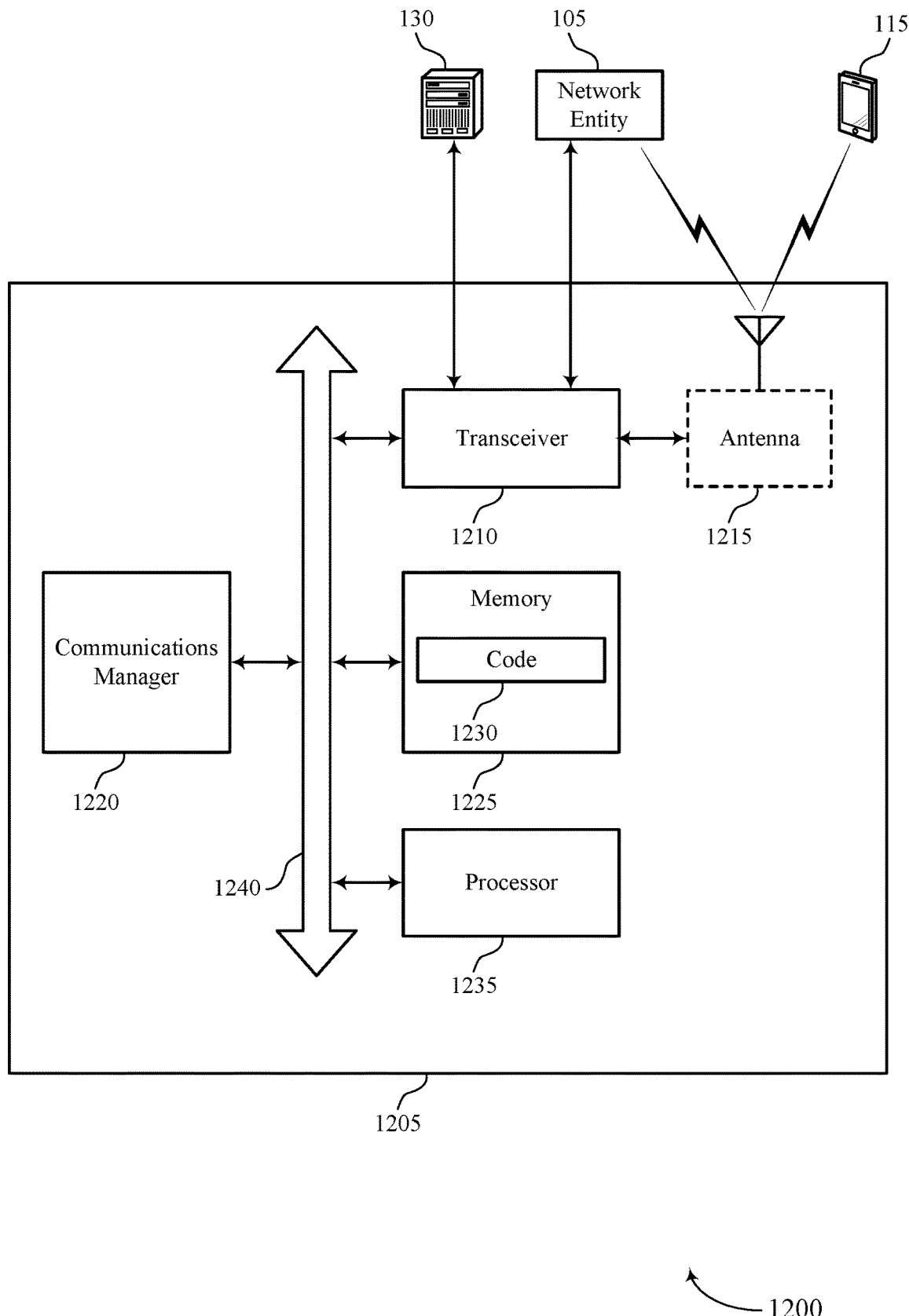
FIG. 12 shows a diagram of a system including a device that supports managing group configurations in wireless communications systems in accordance with one or more aspects of the present disclosure.

FIG. 12 shows a diagram of a system 1200 including a device 1205 that supports managing group configurations in wireless communications systems in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory.

In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting managing group configurations in wireless communications systems). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at the device 1205 (e.g., a network entity) in accordance with examples as disclosed herein. For example, the communications manager 1220 may be configured as or otherwise support a means for transmitting first control signaling indicating a configuration associated with a target network node in a non-terrestrial network, the configuration including a first UE-group configuration and a UE-specific configuration including integrity information for the first UE-group configuration. The communications manager

1220 may be configured as or otherwise support a means for performing a connection operation based on a trust status of the first UE-group configuration.

By including or configuring the communications manager 1220 in accordance with examples as described herein, the device 1205 may support techniques for improved communication reliability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of managing group configurations in wireless communications systems as described herein, or the processor 1235 and the memory 1225 may be otherwise configured to perform or support such operations.

Figure 13:
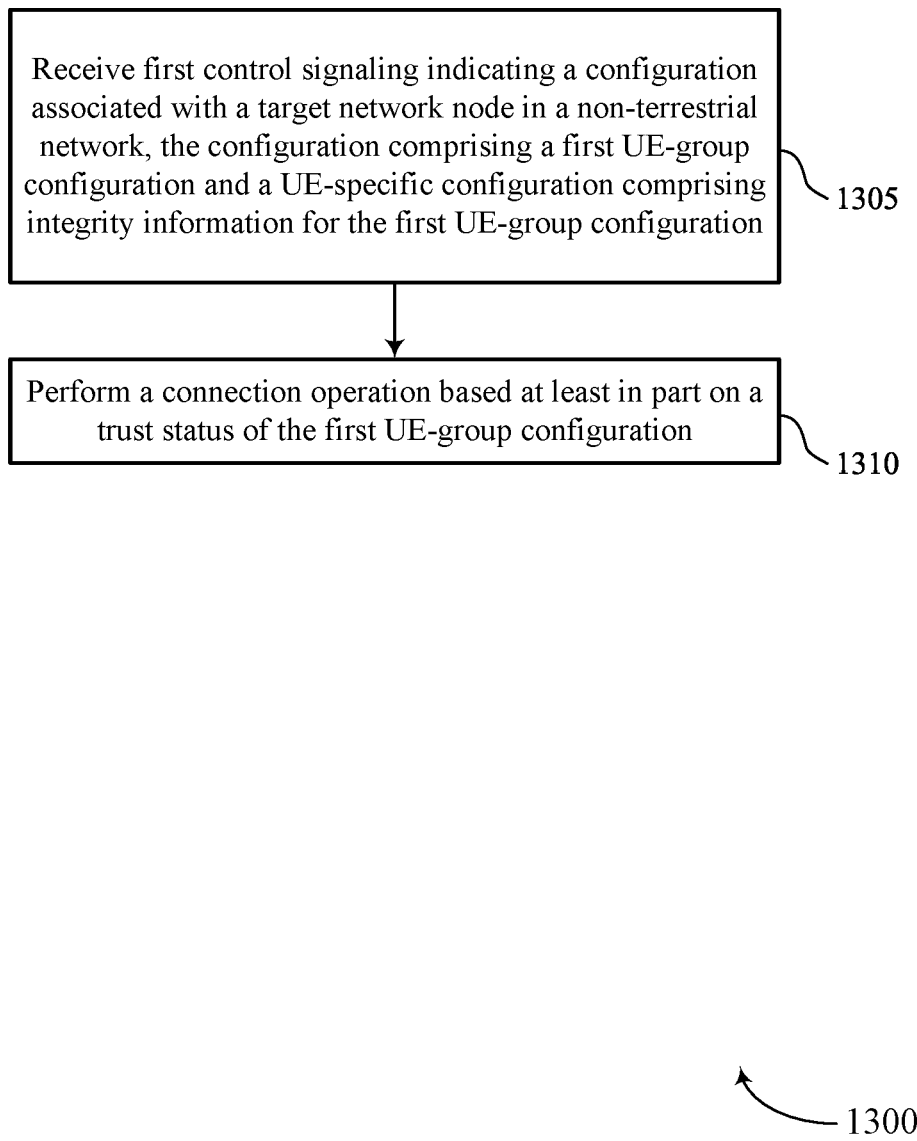
FIGS. 13 and 14 show flowcharts illustrating methods that support managing group configurations in wireless communications systems in accordance with one or more aspects of the present disclosure.

FIG. 13 shows a flowchart illustrating a method 1300 that supports managing group configurations in wireless communications systems in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving first control signaling indicating a configuration associated with a target network node in a non-terrestrial network, the configuration including a first UE-group configuration and a UE-specific configuration including integrity information for the first UE-group configuration. The operations of 1305 may be performed in accordance with examples as disclosed herein. In some examples, aspects of the operations of 1305 may be performed by a configuration component 725 as described with reference to FIG. 7.

At 1310, the method may include performing a connection operation based on a trust status of the first UE-group configuration. The operations of 1310 may be performed in accordance with examples as disclosed herein. In some examples, aspects of the operations of 1310 may be performed by a connection component 735 as described with reference to FIG. 7.

Figure 14:
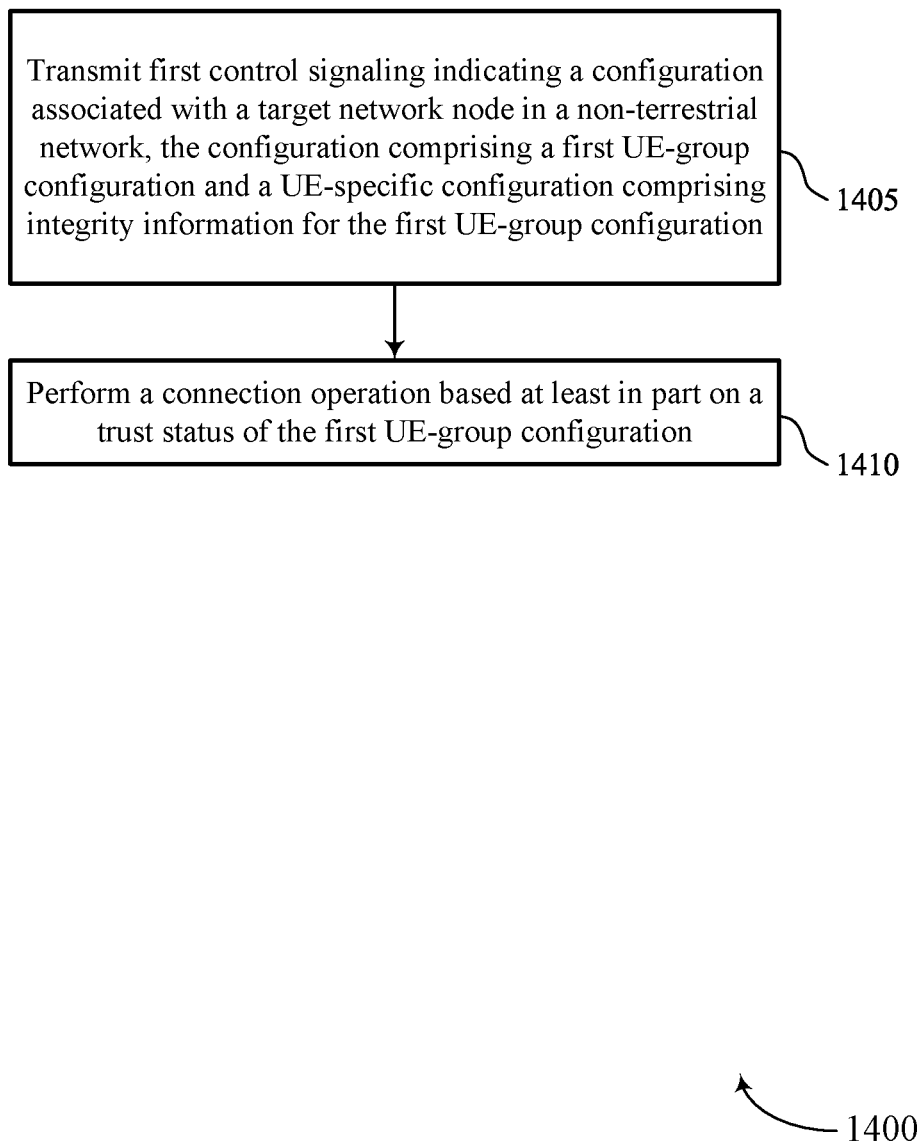

FIG. 14 shows a flowchart illustrating a method 1400 that supports managing group configurations in wireless communications systems in accordance with one or more aspects of the present disclosure. The operations of the method 1400 may be implemented by a network entity or its components as described herein. For example, the operations of the method 1400 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1405, the method may include transmitting first control signaling indicating a configuration associated with a target network node in a non-terrestrial network, the configuration including a first UE-group configuration and a UE-specific configuration including integrity information for the first UE-group configuration. The operations of 1405 may be performed in accordance with examples as disclosed herein. In some examples, aspects of the operations of 1405 may be performed by a configuration component 1125 as described with reference to FIG. 11.

At 1410, the method may include performing a connection operation based on a trust status of the first UE-group configuration. The operations of 1410 may be performed in accordance with examples as disclosed herein. In some examples, aspects of the operations of 1410 may be performed by a connection component 1135 as described with reference to FIG. 11.

The following provides an overview of aspects of the present disclosure:

Aspect 1: A method for wireless communication at a UE, comprising: receiving first control signaling indicating a configuration associated with a target network node in a non-terrestrial network, the configuration comprising a first UE-group configuration and a UE-specific configuration comprising integrity information for the first UE-group configuration; determining a trust status of the first UE-group configuration; and performing a connection operation based at least in part on the trust status of the first UE-group configuration.

Aspect 2: The method of aspect 1, further comprising: performing an integrity check of the first UE-group configuration to obtain the trust status of the first UE-group configuration, wherein performing the connection operation is based at least in part on the integrity check of the first UE-group configuration, and wherein the connection operation comprises a handover from a source network node to the target network node in the non-terrestrial network.

Aspect 3: The method of aspect 2, wherein performing the integrity check of the first UE-group configuration comprises: determining a change in a hash value or a CRC associated with the first UE-group configuration based at least in part on the UE-specific configuration, wherein the integrity information comprising the hash value or the CRC.

Aspect 4: The method of any of aspects 2 through 3, further comprising: performing a post integrity check operation based at least in part on the trust status of the first UE-group configuration.

Aspect 5: The method of any of aspects 2 through 4, wherein performing the connection operation comprises: triggering a reestablishment connection operation to the target network node based at least in part on the trust status of the first UE-group configuration.

Aspect 6: The method of any of aspects 2 through 5, further comprising: transmitting second control signaling indicating the trust status of the first UE-group configuration; and receiving third control signaling indicating a second UE-group configuration based at least in part on the trust status of the first UE-group configuration according to the integrity information, wherein performing the connection operation is based at least in part on the second UE-group configuration.

Aspect 7: The method of any of aspects 1 through 6, further comprising: generating a hash value or a CRC associated with the first UE-group configuration; and transmitting second control signaling indicating the hash value or the CRC associated with the first UE-group configuration, the second control signaling comprising a handover complete message.

Aspect 8: The method of any of aspects 1 through 7, further comprising: selecting one or more parameters associated with the first UE-group configuration; and transmitting second control signaling indicating the one or more parameters associated with the first UE-group configuration.

Aspect 9: The method of any of aspects 1 through 8, wherein the configuration excludes a master security key update.

Aspect 10: The method of any of aspects 1 through 9, further comprising: transmitting second control signaling indicating whether the first UE-group configuration comprises a common configuration or a default configuration, wherein performing the connection operation is based at least in part on the second control signaling.

Aspect 11: The method of any of aspects 1 through 10, further comprising: receiving a SIB associated with the target network node and a non-terrestrial network-specific SIB associated with a network entity in the non-terrestrial network; and transmitting second control signaling indicating a handover complete, wherein performing the connection operation is based at least in part on the second control signaling.

Aspect 12: The method of any of aspects 1 through 11, further comprising: receiving a DCI over a PDCCH, the DCI scheduling a PDSCH, the DCI including a G-RNTI or a SI-RNTI for the integrity information, wherein receiving the first control signaling indicating the configuration associated with the target network node in the non-terrestrial network is based at least in part on the DCI.

Aspect 13: The method of aspect 12, further comprising: determining a time interval for receiving the PDCCH based at least in part on scheduling information, wherein receiving the DCI over the PDCCH comprises: receiving the DCI over the PDCCH during the time interval.

Aspect 14: The method of any of aspects 12 through 13, further comprising: determining a PDCCH search space for receiving the PDCCH based at least in part on a search space configuration associated with a group of UEs, wherein receiving the DCI over the PDCCH comprises: receiving the DCI over the PDCCH based at least in part on the PDCCH search space.

Aspect 15: The method of any of aspects 12 through 14, further comprising: monitoring the G-RNTI or a C-RNTI based at least in part on a periodicity, wherein receiving the DCI over the PDCCH is based at least in part on the G-RNTI or the C-RNTI.

Aspect 16: The method of any of aspects 1 through 15, wherein the first UE-group configuration comprises one or more cell-specific parameters associated with the target network node.

Aspect 17: The method of aspect 16, wherein the one or more cell-specific parameters comprise one or more broadcast cell-specific parameters of a system information associated with the target network node.

Aspect 18: The method of any of aspects 1 through 17, wherein the UE-specific configuration comprises one or more UE-specific parameters associated with a group of UEs in the non-terrestrial network.

Aspect 19: The method of aspect 18, wherein receiving the first control signaling comprises receiving the first UE-group configuration in a logical channel associated with a radio link control transparent mode or a signaling radio bearer configuration, or both.

Aspect 20: The method of any of aspects 1 through 19, wherein the first UE-group configuration comprises a common configuration or a default configuration.

Aspect 21: A method for wireless communication at a network entity, comprising: transmitting first control signaling indicating a configuration associated with a target network node in a non-terrestrial network, the configuration comprising a first UE-group configuration and a UE-specific configuration comprising integrity information for the first UE-group configuration; determining a trust status of the first UE-group configuration; and performing a connection operation based at least in part on the trust status of the first UE-group configuration.

Aspect 22: The method of aspect 21, further comprising: performing an integrity check of the first UE-group configuration to obtain the trust status of the first UE-group configuration, wherein performing the connection operation is based at least in part on the integrity check of the first UE-group configuration.

Aspect 23: The method of any of aspects 21 through 22, further comprising: receiving second control signaling indicating a change to a hash value or a CRC associated with the first UE-group configuration; and transmitting third control signaling indicating a second UE-group configuration based at least in part on the trust status of the first UE-group configuration according to the integrity information.

Aspect 24: The method of any of aspects 21 through 23, further comprising: receiving second control signaling indicating one or more parameters associated with the first UE-group configuration.

Aspect 25: The method of aspect 24, further comprising: receiving a request to verify the one or more parameters associated with the first UE-group configuration; and determining the trust status of the first UE-group configuration based at least in part on verifying the one or more parameters associated with the first UE-group configuration.

Aspect 26: The method of any of aspects 24 through 25, wherein transmitting the first control signaling comprises transmitting the first UE-group configuration in a logical channel associated with a radio link control transparent mode or a signaling radio bearer configuration, or both.

Aspect 27: The method of any of aspects 21 through 26, further comprising: transmitting DCI over a PDCCH, the DCI scheduling a PDSCH, the DCI including a G-RNTI or a SI-RNTI for the integrity information.

Aspect 28: The method of any of aspects 21 through 27, wherein transmitting the second control signaling indicating the second UE-group configuration is based at least in part on a G-RNTI.

Aspect 29: An apparatus for wireless communication at a UE, comprising a processor; memory coupled with the processor; and instructions stored in the memory and executable by the processor to cause the apparatus to perform a method of any of aspects 1 through 20.

Aspect 30: An apparatus for wireless communication at a UE, comprising at least one means for performing a method of any of aspects 1 through 20.

Aspect 31: A non-transitory computer-readable medium storing code for wireless communication at a UE, the code comprising instructions executable by a processor to perform a method of any of aspects 1 through 20.

Aspect 32: An apparatus for wireless communication at a network entity, comprising a processor; memory coupled with the processor; and instructions stored in the memory and executable by the processor to cause the apparatus to perform a method of any of aspects 21 through 28.

Aspect 33: An apparatus for wireless communication at a network entity, comprising at least one means for performing a method of any of aspects 21 through 28.

Aspect 34: A non-transitory computer-readable medium storing code for wireless communication at a network entity, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
one or more memories storing processor-executable code; and
one or more processors coupled with the one or more memories and individually or collectively operable to execute the code to cause the UE to:
receive first control signaling indicating a configuration associated with a target network node in a non-terrestrial network, the configuration comprising a first UE-group configuration and a UE-specific configuration, wherein the first UE-group configuration comprises one or more signaling parameters associated with the target network node and the UE-specific configuration comprises one or more signaling parameters associated with the UE, and wherein the UE-specific configuration further comprises integrity information for the first UE-group configuration; and
perform a connection operation based at least in part on a trust status of the first UE-group configuration, wherein the trust status of the first UE-group configuration is based at least in part on the integrity information included in the UE-specific configuration.

2. The UE of claim 1, wherein the one or more processors are individually or collectively further operable to execute the code to cause the UE to:
perform an integrity check of the first UE-group configuration to obtain the trust status of the first UE-group configuration, wherein the one or more processors are individually or collectively operable to execute the code to cause the UE to perform the connection operation based at least in part on the integrity check of the first UE-group configuration, and wherein the connection operation comprises a handover from a source network node to the target network node in the non-terrestrial network.

3. The UE of claim 2, wherein, to perform the integrity check of the first UE-group configuration, the one or more processors are individually or collectively operable to execute the code to cause the UE to:
determine a change in a hash value or a cyclic redundancy check associated with the first UE-group configuration based at least in part on the UE-specific configuration, wherein the integrity information comprises the hash value or the cyclic redundancy check.

4. The UE of claim 2, wherein the one or more processors are individually or collectively further operable to execute the code to cause the UE to
perform a post integrity check operation based at least in part on the trust status of the first UE-group configuration.

5. The UE of claim 2, wherein, to perform the connection operation, the one or more processors are individually or collectively operable to execute the code to cause the UE to:
trigger a reestablishment connection operation to the target network node based at least in part on the trust status of the first UE-group configuration.

6. The UE of claim 2, wherein the one or more processors are individually or collectively further operable to execute the code to cause the UE to:
transmit second control signaling indicating the trust status of the first UE-group configuration; and
receive third control signaling indicating a second UE-group configuration based at least in part on the trust status of the first UE-group configuration according to the integrity information, wherein the one or more processors are individually or collectively operable to execute the code to cause the UE to perform the connection operation based at least in part on the second UE-group configuration.

7. The UE of claim 1, wherein the one or more processors are individually or collectively further operable to execute the code to cause the UE to:
generate a hash value or a cyclic redundancy check associated with the first UE-group configuration; and
transmit second control signaling indicating the hash value or the cyclic redundancy check associated with the first UE-group configuration, the second control signaling comprising a handover complete message.

8. The UE of claim 1, wherein the one or more processors are individually or collectively further operable to execute the code to cause the UE to:
select one or more parameters associated with the first UE-group configuration; and
transmit second control signaling indicating the one or more parameters associated with the first UE-group configuration.

9. The UE of claim 1, wherein the configuration excludes a master security key update.

10. The UE of claim 1, wherein the one or more processors are individually or collectively further operable to execute the code to cause the UE to:
transmit second control signaling indicating whether the first UE-group configuration comprises a common configuration or a default configuration, wherein the one or more processors are individually or collectively operable to execute the code to cause the UE to perform the connection operation based at least in part on the second control signaling.

11. The UE of claim 1, wherein the one or more processors are individually or collectively further operable to execute the code to cause the UE to:
receive a system information block associated with the target network node and a non-terrestrial network-specific system information block associated with a network entity in the non-terrestrial network; and
transmit second control signaling indicating a handover complete, wherein performing the connection operation is based at least in part on the second control signaling.

12. The UE of claim 1, wherein the one or more processors are individually or collectively further operable to execute the code to cause the UE to:
receive a downlink control information over a physical downlink control channel, the downlink control information scheduling a physical downlink shared channel, the downlink control information including a group radio network temporary identifier or a system information radio network temporary identifier for the integrity information, wherein the one or more processors are individually or collectively operable to execute the code to cause the UE to receive the first control signaling indicating the configuration associated with the target network node in the non-terrestrial network based at least in part on the downlink control information.

13. The UE of claim 12, wherein the one or more processors are individually or collectively further operable to execute the code to cause the UE to:
determine a time interval for receiving the physical downlink control channel based at least in part on scheduling information, wherein, to receive the downlink control information over the physical downlink control channel, the one or more processors are individually or collectively operable to execute the code to cause the UE to:
receive the downlink control information over the physical downlink control channel during the time interval.

14. The UE of claim 12, wherein the one or more processors are individually or collectively further operable to execute the code to cause the UE to:
determine a physical downlink control channel search space for receiving the physical downlink control channel based at least in part on a search space configuration associated with a group of UEs, wherein, to receive the downlink control information over the physical downlink control channel, the one or more processors are individually or collectively operable to execute the code to cause the UE to:
receive the downlink control information over the physical downlink control channel based at least in part on the physical downlink control channel search space.

15. The UE of claim 12, wherein the one or more processors are individually or collectively further operable to execute the code to cause the UE to:
monitor the group radio network temporary identifier or a cell radio network temporary identifier based at least in part on a periodicity, wherein the one or more processors are individually or collectively operable to execute the code to cause the UE to receive the downlink control information over the physical downlink control channel based at least in part on the group radio network temporary identifier or the cell radio network temporary identifier.

16. The UE of claim 1, wherein the first UE-group configuration comprises one or more cell-specific parameters associated with the target network node.

17. The UE of claim 16, wherein the one or more cell-specific parameters comprise one or more broadcast cell-specific parameters of a system information associated with the target network node.

18. The UE of claim 1, wherein the UE-specific configuration comprises one or more UE-specific parameters associated with a group of UEs in the non-terrestrial network.

19. The UE of claim 18, wherein, to receive the first control signaling, the one or more processors are individually or collectively operable to execute the code to cause the UE to:
receive the first UE-group configuration in a logical channel associated with a radio link control transparent mode or a signaling radio bearer configuration, or both.

20. The UE of claim 1, wherein the first UE-group configuration comprises a common configuration or a default configuration.

21. A network entity for wireless communication, comprising:
one or more memories storing processor-executable code; and
one or more processors coupled with the one or more memories and individually or collectively operable to execute the code to cause the network entity to:
transmit first control signaling indicating a configuration associated with a target network node in a non-terrestrial network, the configuration comprising a first user equipment (UE)-group configuration and a UE-specific configuration, wherein the first UE-group configuration comprises one or more signaling parameters associated with the target network node and the UE-specific configuration comprises one or more signaling parameters associated with a UE, and wherein the UE-specific configuration further comprises integrity information for the first UE-group configuration; and
perform a connection operation based at least in part on a trust status of the first UE-group configuration, wherein the trust status of the first UE-group configuration is based at least in part on the integrity information included in the UE-specific configuration.

22. The network entity of claim 21, wherein the one or more processors are individually or collectively further operable to execute the code to cause the network entity to:
perform an integrity check of the first UE-group configuration to obtain the trust status of the first UE-group configuration, wherein the one or more processors are individually or collectively operable to execute the code to cause the network entity to perform the connection operation based at least in part on the integrity check of the first UE-group configuration.

23. The network entity of claim 21, wherein the one or more processors are individually or collectively further operable to execute the code to cause the network entity to:
receive second control signaling indicating a change to a hash value or a cyclic redundancy check associated with the first UE-group configuration; and
transmit third control signaling indicating a second UE-group configuration based at least in part on the trust status of the first UE-group configuration according to the integrity information.

24. The network entity of claim 21, wherein the one or more processors are individually or collectively further operable to execute the code to cause the network entity to:
receive second control signaling indicating one or more parameters associated with the first UE-group configuration.

25. The network entity of claim 24, wherein the one or more processors are individually or collectively further operable to execute the code to cause the network entity to:
receive a request to verify the one or more parameters associated with the first UE-group configuration; and
determine the trust status of the first UE-group configuration based at least in part on verifying the one or more parameters associated with the first UE-group configuration.

26. The network entity of claim 24, wherein, to transmit the first control signaling, the one or more processors are individually or collectively operable to execute the code to cause the network entity to:

transmit the first UE-group configuration in a logical channel associated with a radio link control transparent mode or a signaling radio bearer configuration, or both.

27. The network entity of claim 21, wherein the one or more processors are individually or collectively further operable to execute the code to cause the network entity to: transmit downlink control information over a physical downlink control channel, the downlink control information scheduling a physical downlink shared channel, the downlink control information including a group radio network temporary identifier or a system information radio network temporary identifier for the integrity information.

28. The network entity of claim 21, wherein the one or more processors are individually or collectively further operable to execute the code to cause the network entity to: transmit second control signaling indicating a second UE-group configuration based at least in part on a group radio network temporary identifier.

29. A method for wireless communication at a user equipment (UE), comprising:
receiving first control signaling indicating a configuration associated with a target network node in a non-terrestrial network, the configuration comprising a first UE-group configuration and a UE-specific configuration, wherein the first UE-group configuration comprises one or more signaling parameters associated with the target network node and the UE-specific configuration comprises one or more signaling parameters associated with the UE, and wherein the UE-specific configuration further comprises integrity information for the first UE-group configuration; and
performing a connection operation based at least in part on a trust status of the first UE-group configuration, wherein the trust status of the first UE-group configuration is based at least in part on the integrity information included in the UE-specific configuration.

30. A method for wireless communication at a network entity, comprising:
transmitting first control signaling indicating a configuration associated with a target network node in a non-terrestrial network, the configuration comprising a first user equipment (UE)-group configuration and a UE-specific configuration, wherein the first UE-group configuration comprises one or more signaling parameters associated with the target network node and the UE-specific configuration comprises one or more signaling parameters associated with a UE, and wherein the UE-specific configuration further comprises integrity information for the first UE-group configuration; and
performing a connection operation based at least in part on a trust status of the first UE-group configuration, wherein the trust status of the first UE-group configuration is based at least in part on the integrity information included in the UE-specific configuration.

* * * * *